(12) United States Patent
Kurani

(10) Patent No.: US 10,603,779 B2
(45) Date of Patent: Mar. 31, 2020

(54) ADAPTABLE POLE FOR A POOL DEVICE

(71) Applicant: Hemant Chandrakant Kurani, Riverside, CA (US)

(72) Inventor: Hemant Chandrakant Kurani, Riverside, CA (US)

( * ) Notice: Subject to any disclaimer, the term of this patent is extended or adjusted under 35 U.S.C. 154(b) by 155 days.

(21) Appl. No.: 15/645,830

(22) Filed: Jul. 10, 2017

(65) Prior Publication Data

US 2018/0015606 A1    Jan. 18, 2018

Related U.S. Application Data

(60) Provisional application No. 62/361,119, filed on Jul. 12, 2016.

(51) Int. Cl.
| | | |
|---|---|---|
| *B25G 1/04* | (2006.01) | |
| *B25G 3/28* | (2006.01) | |
| *B25G 3/18* | (2006.01) | |
| *F16B 7/04* | (2006.01) | |
| *B25G 3/00* | (2006.01) | |
| *F16B 35/00* | (2006.01) | |
| *F16B 2/24* | (2006.01) | |
| *F16B 2/04* | (2006.01) | |
| *F16B 7/18* | (2006.01) | |

(52) U.S. Cl.
CPC ............... *B25G 1/04* (2013.01); *B25G 3/00* (2013.01); *B25G 3/18* (2013.01); *B25G 3/28* (2013.01); *F16B 7/042* (2013.01); *F16B 7/0406* (2013.01); *F16B 2/04* (2013.01); *F16B 2/245* (2013.01); *F16B 7/182* (2013.01); *F16B 35/005* (2013.01)

(58) Field of Classification Search
CPC ... B25G 1/04; B25G 3/00; B25G 3/28; B25G 3/18; F16B 7/0406; F16B 7/182; F16B 2/245; F16B 2/04; F16B 7/042; F16B 35/005; Y10T 16/4719; Y10T 16/473
USPC .......... 16/427, 429; 15/144.1, 144.4; 74/544; 403/109.3
See application file for complete search history.

(56) References Cited

U.S. PATENT DOCUMENTS

| | | | | |
|---|---|---|---|---|
| 4,247,216 A | * | 1/1981 | Pansini | B25G 3/18 15/1.7 |
| 5,799,357 A | * | 9/1998 | Taylor | E04H 4/1609 15/144.4 |
| 10,188,200 B1 | * | 1/2019 | Hetzner | A46B 5/0095 |

(Continued)

FOREIGN PATENT DOCUMENTS

WO    WO2004000506    12/2003

*Primary Examiner* — William L Miller
(74) *Attorney, Agent, or Firm* — Snell & Wilmer LLP

(57) ABSTRACT

A modular pole includes a first tube having a first end and a second end, the second end defining a first through-hole oriented perpendicular to an axis of the first tube. The modular pole further includes a second tube having a first end and a second end, the first end defining a second through-hole oriented perpendicular to an axis of the second tube, and the second end including a device connector for connecting the second tube to the pool device. The modular pole further includes a first tube connector designed to be positioned within the first tube and the second tube and having a first retractable protrusion designed to extend through the first through-hole when the first tube connector is positioned within the first tube and a second retractable protrusion designed to extend through the second through-hole when the first tube connector is positioned within the second tube.

13 Claims, 18 Drawing Sheets

(56) References Cited

U.S. PATENT DOCUMENTS

| | | |
|---|---|---|
| 2003/0180085 A1 | 9/2003 | Hughes |
| 2005/0097691 A1 | 5/2005 | Tsuchiya et al. |
| 2005/0123344 A1 | 6/2005 | Bensussan |
| 2005/0224517 A1 | 10/2005 | Healy et al. |
| 2006/0288508 A1* | 12/2006 | Knopow ................ A47L 13/24 |
| | | 15/144.1 |

* cited by examiner

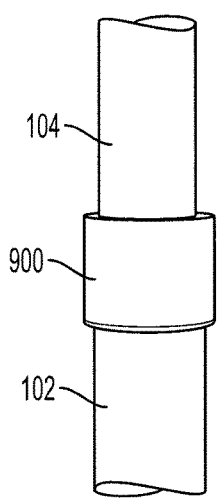
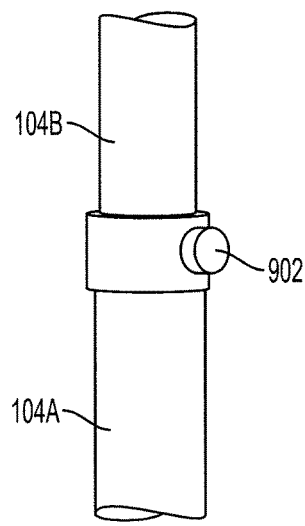
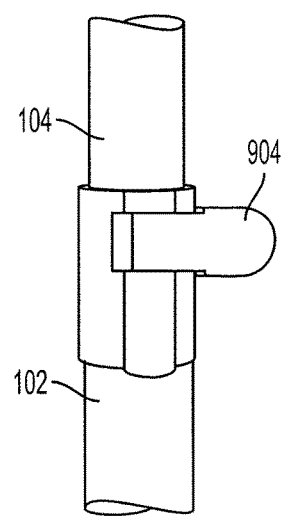
FIG. 8A    FIG. 8B    FIG. 8C
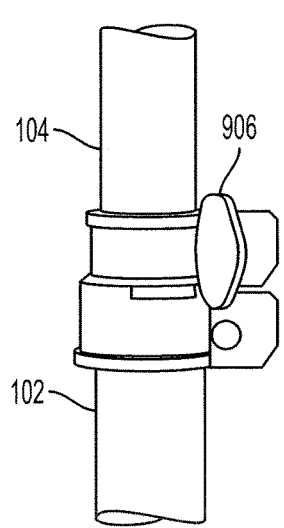
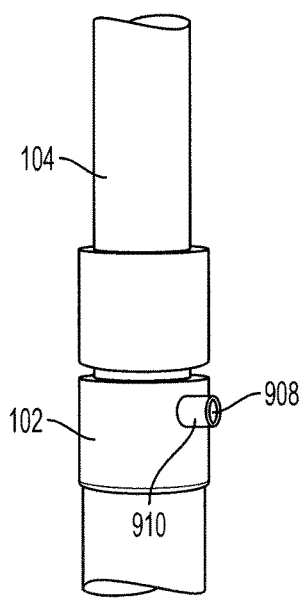
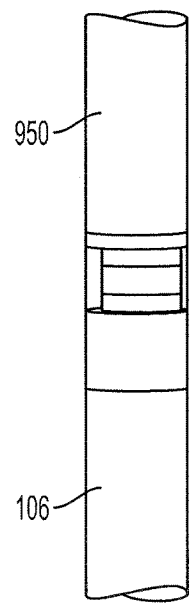
FIG. 8D    FIG. 8E    FIG. 8F

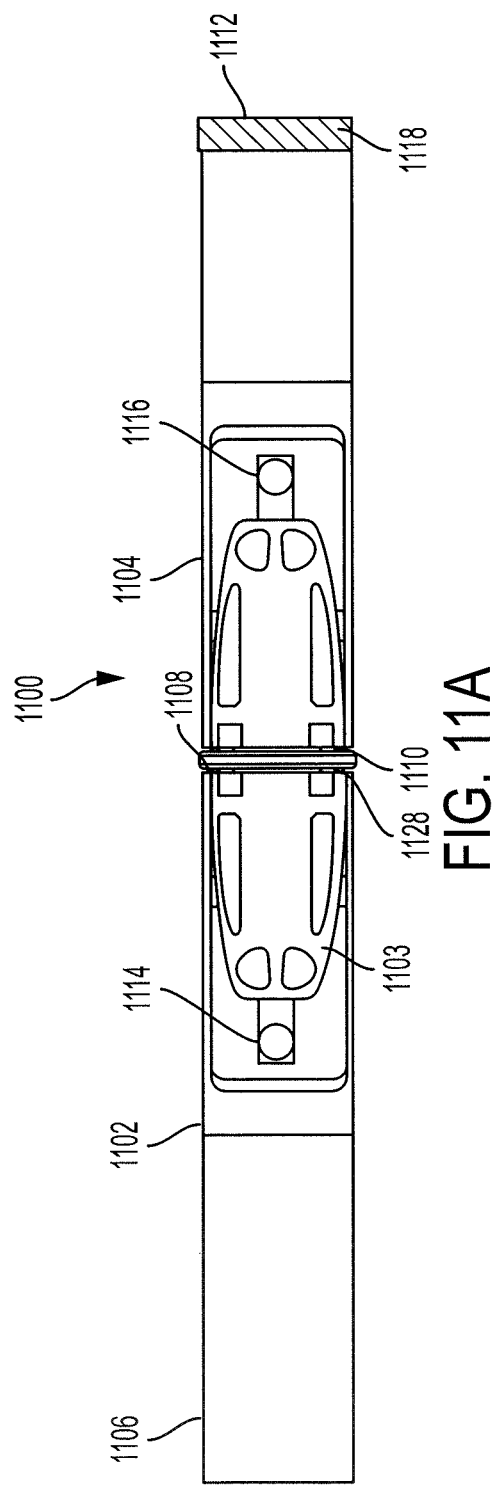

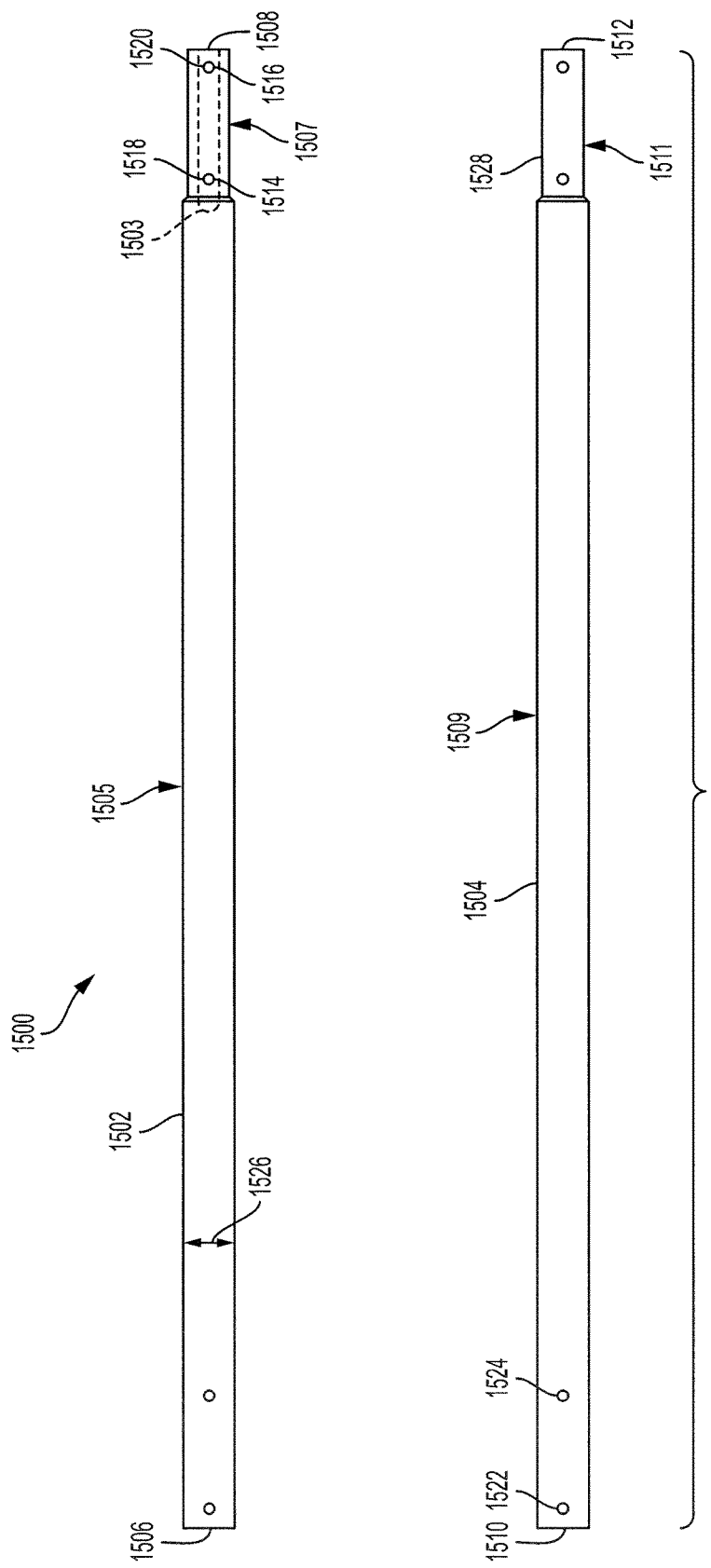

ADAPTABLE POLE FOR A POOL DEVICE

CROSS REFERENCE TO RELATED APPLICATIONS

This application claims the benefit and priority of U.S. Provisional Application No. 62/361,119, entitled "Adaptable Pole For A Pool Device," filed on Jul. 12, 2016, the entire contents of which are hereby incorporated by reference herein.

BACKGROUND

Field

The present disclosure relates to a modular pole for use with pool equipment and, more particularly, to a modular pole having multiple pieces coupled together and at least one connector for connecting the modular pole to a pool device.

Description of the Related Art

Multiple pieces of pool equipment are suggested for pool maintenance. Much of this equipment includes a device attached to an end of a pole. For example, pool equipment may include a net, a rake, a brush, or a vacuum head attached to a pole.

With the current shift towards online ordering and product delivery, much of this equipment is being ordered online and shipped to a consumer. Some pool equipment may be relatively bulky. In particular, a pole may be relatively long, such as between 6 feet and 20 feet. The cost of shipping increases as the size of the product (i.e., a length of a pole) increases. Thus, there is a need for a modular pole that is capable of being shipped in relatively small packaging that is relatively resistant to bending when in use.

SUMMARY

Disclosed herein is a modular pole for use with a pool device. The modular pole includes a first tube having a first end and a second end, the second end defining a first through-hole oriented perpendicular to an axis of the first tube. The modular pole further includes a second tube having a first end and a second end, the first end defining a second through-hole oriented perpendicular to an axis of the second tube, and the second end including a device connector for connecting the second tube to the pool device. The modular pole further includes a first tube connector designed to be positioned within the first tube and the second tube and having a first retractable protrusion designed to extend through the first through-hole when the first tube connector is positioned within the first tube and a second retractable protrusion designed to extend through the second through-hole when the first tube connector is positioned within the second tube.

Also disclosed is a modular pole for use with a pool device. The modular pole includes a first tube having a first end and a narrow end, the narrow end defining a first through-hole oriented perpendicular to an axis of the first tube. The modular pole further includes a second tube having a first end and a narrow end, the first end defining a second through-hole oriented perpendicular to an axis of the second tube, the first end of the second tube designed to receive the narrow end of the first tube, and at least one of the first end of the first tube or the narrow end of the second tube including a device connector for connecting the first tube or the second tube to the pool device. The modular pole further includes a first spring clip having a first retractable protrusion designed to extend through the first through-hole of the first tube and the second through-hole of the second tube when the first spring clip is coupled to the first tube and the second tube, the first retractable protrusion coupling the first tube to the second tube.

Also disclosed is a modular pole for use with a pool device. The modular pole includes a handle rod having a first diameter, a first handle end having a first gripping material attached to an outer surface of the handle rod and extending at least 3 inches towards a center of the handle rod, and a second handle end having interior screw threading extending between 2 and 3 inches from the second handle end towards the center of the handle rod. The modular pole further includes a middle rod having a second diameter that is substantially equal to the first diameter, a first middle end having exterior screw threading extending for between 2 and 3 inches from the first middle end towards a center of the middle rod and configured to attach to the interior screw threading of the second handle end via rotation, and a second middle end having interior screw threading extending between 2 and 3 inches from the second middle end towards the center of the middle rod. The modular pole further includes a device rod having a third diameter that is substantially equal to the second diameter, a first device end having exterior screw threading extending for between 2 and 3 inches from the first device end towards a center of the device rod and configured to attach to the interior screw threading of the second middle end via rotation, and a second device end having a connector that is adapted to attach to the pool device.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 8A illustrates an aluminum clutch lock that is adapted to attach two rods of a modular pole together according to an embodiment of the invention;

FIG. 8B illustrates a set knob that is adapted to attach two rods of a modular pole together according to an embodiment of the invention;

FIG. 8C illustrates a snap collar lock that is adapted to attach two rods of a modular pole together according to an embodiment of the invention;

FIG. 8D illustrates a split collar lock that is adapted to attach two rods of a modular pole together according to an embodiment of the invention;

FIG. 8E illustrates a spring button lock that is adapted to attach two rods of a modular pole together according to an embodiment of the invention;

FIG. 8F illustrates an internal cam lock that is adapted to attach two rods of a modular pole together according to an embodiment of the invention;

FIGS. 11A-11C illustrate a modular pole having a first tube coupled to a second tube via an internal tube connector according to an embodiment of the invention;

FIG. 15 illustrates a modular pole having two tubes each with a main portion and a narrow portion that are coupled together using a spring clip extending through through-holes of the narrow portion of a first tube and the main portion of a second tube according to an embodiment of the invention;

DETAILED DESCRIPTION OF THE PREFERRED EMBODIMENTS

Exemplary embodiments of a modular pole will now be described in detail. These embodiments describe various features and functionality of modular poles.

Various components are illustrated throughout the drawings. The illustrated components may or may not be drawn to scale. For example, various rods and poles are shown; some of the rods and/or poles may have a greater ratio of length to width than illustrated.

Figure 1A:
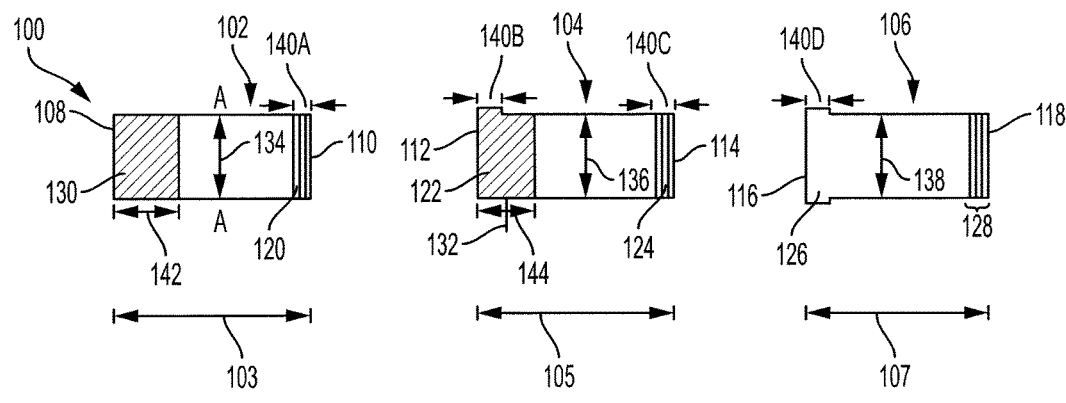
FIG. 1A illustrates a modular pole having three rods coupled together via screw threading according to an embodiment of the invention.

FIG. 1A illustrates a pole 100. The pole 100 may be used with (i.e., coupled to) various pieces of equipment, such as equipment used in pool maintenance. Pool maintenance equipment may include a pool net, a pool rake, a pool brush, a pool vacuum or the like. The pole 100 may include a handle rod 102, a middle rod 104, and a device rod 106. In various embodiments, the pole 100 may include more than three rods. For example, the pole 100 may include a handle rod, two middle rods, and one device rod 106. In some embodiments, the rods may include tubes or other elongated structures.

Significant force may be applied to the pole 100 during use. For example, the pole 100 may be attached to a pool rake in which case the pole 100 may support a net full of leaves while passing through water. It is desirable that the handle rod 102, the middle rod 104, and the device rod 106 be capable of supporting support this force with relatively little bending. Therefore, the handle rod 102, the middle rod 104 and the device rod 106 may be made from metal, metal alloys, plastic, treated wood, fiberglass or other composite material having a relatively high tensile strength. This allows the pole 100 to resist bending when force is applied to both ends of the pole 100.

The handle rod 102 has a length 103. The length 103 may be any length, such as between three feet and six feet (0.91 meters (m) and 1.8 m). The middle rod 104 may have a length 105. The length 105 may be any length, such as between three feet and six feet. The device rod 106 may have a length 107. The length 107 may be any length, such as between three feet and six feet. One or more of the length 103, the length 105, and the length 107 may have different values, or two or more of the length 103, the length 105, and the length 107 may have the same value.

The handle rod 102 may have a first end 108 and a second end 110. The first end 108 may have a gripping material 130 attached thereto. The gripping material 130 may be manufactured on the first end 108 of the handle rod 102 or it may be removably coupled to the first end 108 of the handle rod 102. The gripping material 130 may be a sleeve adapted to slide on to the first end 108. The gripping material 130 may have properties that allow the gripping material 130 to resist separation from the first end 108 during use. For example, an inner surface of the gripping material 130 may include a material adapted to provide significant friction with the first end 108 of the handle rod 102.

Figure 5:
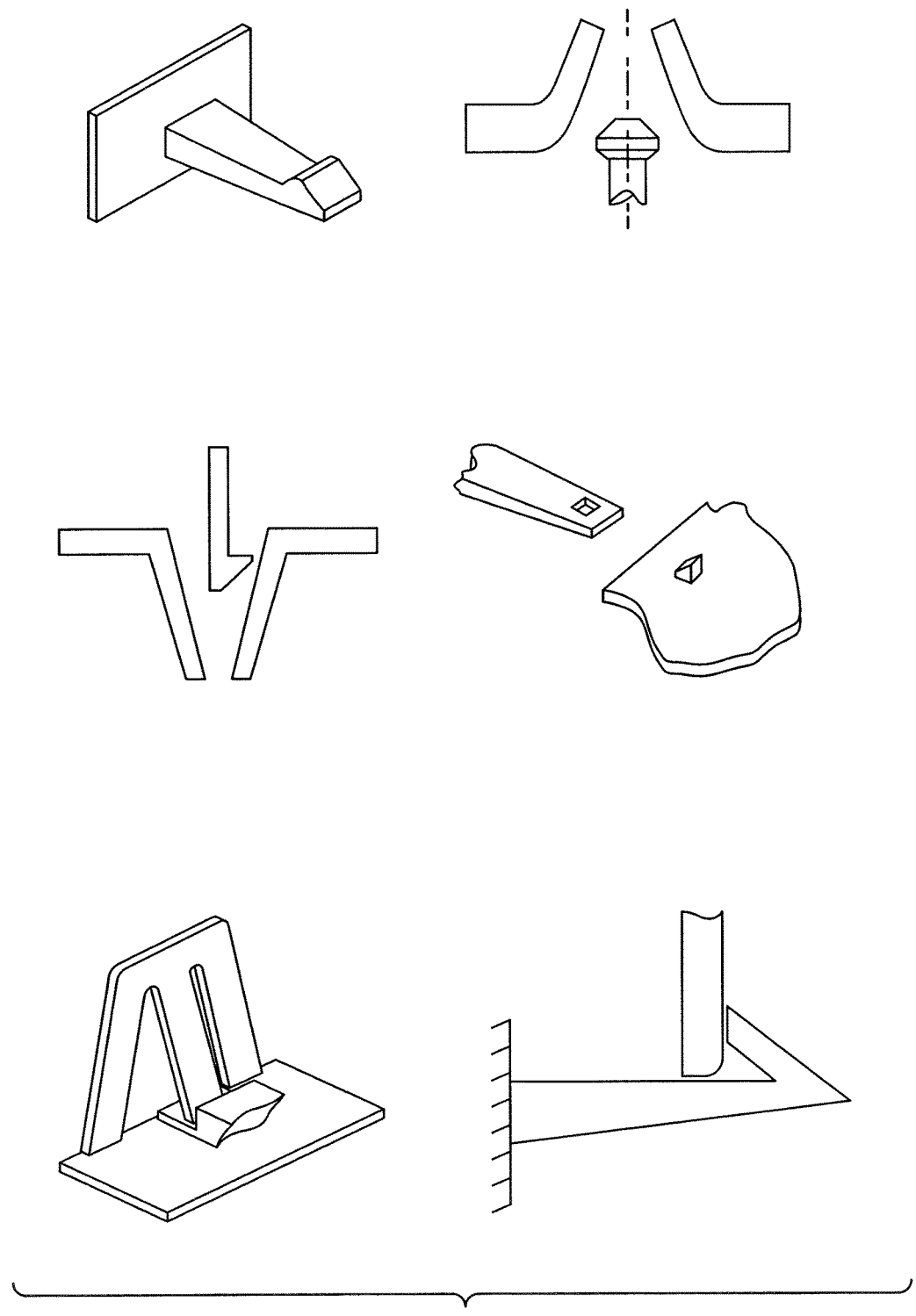
FIG. 5 illustrates different designs of snap connectors used to couple various rods of a modular pole together according to various embodiments of the invention.

The second end 110 may have a connector such as external screw threading 120. The connector may also or instead include any other type of connector, such as any snap connector including but not limited to those illustrated in FIG. 5, other connectors including but not limited to those illustrated in FIGS. 8A-8I, spring clips, pressure locks, cam locks, or the like.

As described above, the pole 100 may be subjected to significant forces. In that regard, it is desirable for the pole 100 to resist bending (i.e., to have a relatively high tensile strength).

In order to provide sufficient strength between the different rods, the external screw threading 120 may be relatively fine. This relatively fine threading increases the strength of the connection with the middle rod 104. Additionally, the external screw threading 120 extends for a length 140A from the second end 110 of the handle rod 102. In some embodiments, the length 140A may be two to three inches, thus providing a connection with the middle rod 104 that has a relatively high strength. In some embodiments, the length 140A may be less than two inches or greater than three inches.

The handle rod 102 may be a hollow tube having a diameter 134. The diameter 134 may be any distance, such as between half (0.5) of an inch to three (3) inches (12.7 millimeters (mm) and 76.2 mm), and a wall thickness of the handle rod may be between 0.197 inches and 0.591 inches (0.5 mm and 1.5 mm). Each rod of the pole 100 may have similar characteristics.

The gripping material 130 may be any material that increases friction between the pole 100 and a hand of a user. For example, the gripping material 130 may include rubber, foam, a grooved surface, or the like. The gripping material 130 may extend for a distance 142 from the first end 108 of the handle rod 102. The distance 142 may be between three inches and six inches (76 mm and hundred and 50 mm). If the distance 143 is six inches, it may provide sufficient surface area for both of a user's hands to grip the gripping material 130. A three inch distance 143 may be sufficient for one hand of the user to grip the gripping material 130.

As the pole 100 may be used around a swimming pool, it may become wet. Some materials tend to lose friction when wet, such as metal or plastic. By providing a gripping material 130 that covers a sufficient area and resists such loss of friction, the user may be able to maintain friction with the pole 100 even when the pole 100 is exposed to water. The gripping material 130 may also include the same material as the remainder of the pole 100 but may be grooved or otherwise patterned to increase friction with a hand.

A line A-A' is drawn through the handle rod 102 along the diameter 134. A slice of the handle rod 102 viewed along lines A-A' may be circular, square, oval, rectangular or the like. FIG. 1C illustrates four embodiments of a cross-section of the handle rod 102.

A cross-section 180A illustrates a circular handle rod. A cross-section 180B illustrates a square handle rod. A cross-section 180C illustrates an oval handle rod. A cross-section 180D illustrates a rectangular handle rod. The handle rod 102 is not limited to the shapes and may include any other shape such a triangle, a hexagon, or the like.

The rectangular rods (illustrated in cross-sections 180B and 180D) are less prone to bending (i.e., have a greater resistance to bending) than a rounded rod having the circular cross-section 180A or the oval cross-section 180C. However, a rod having the square cross-section 180B or the rectangular cross-section 180D may be relatively awkward to grip.

Returning reference to FIG. 1A, when a square or rectangular handle rod 102 is provided, the gripping material 130 may be adapted to provide a rounded gripping surface. For example, the gripping material 130 may have a square opening that is adapted to slide onto a square handle rod 102. Extra material may be provided in some areas of the gripping material 130 so that an exterior of the gripping material 130 is relatively round and better suited for gripping. In some embodiments, the exterior of the gripping material 130 may form another shape, such as a shape that includes one or more indention for receiving one or more finger.

The middle rod 104 may include a first end 112 and a second end 114. The middle rod 104 may have a diameter 136. The diameter 136 of the middle rod 104 may be substantially the same as the diameter 134 of the handle rod 102.

By providing the middle rod 104 with a same diameter 136 as the diameter 134 of the handle rod 102, the pole 100 will be more resistant to bending than if the diameter 136 was smaller than the diameter 134 or vice versa. The middle rod 104 may have the same cross-sectional shape across its diameter 136 as the handle rod 102.

The first end 112 of the middle rod 104 may or may not include a gripping material 132. The gripping material 132 may be manufactured onto the middle rod 104 or it may be removable, similar to the gripping material 130. The gripping material 132 may extend a distance 144 from the first end 112 of the middle rod 104. The distance may be at least three inches long.

Sometimes when using the pole 100, it is desirable to grip the pole at two separate locations. This allows for increased control of the pole 100 than if the user gripped the pole at adjacent locations. The gripping material 132 may be adapted to slide over the handle rod 102 or the middle rod 104. This ability may allow the user to position the gripping material 132 at a location that is best suited for user preferences and arm length.

The first end 112 of the middle rod 104 may also include a connector. This connector may include, for example, interior screw threading 122. In some embodiments, the connector may also or instead include a snap connector including but not limited to those illustrated in FIG. 5, other connectors including but not limited to those illustrated in FIGS. 8A-8I, a spring clip, a cam lock, a pressure lock, or the like. The interior screw threading 122 may include relatively fine screw threading to provide a relatively rigid connection between the handle rod 102 and the middle rod 104. The interior screw threading 122 may extend for a distance 140B from the first end 112 of the middle rod 104. The distance 140B may be between two and three inches. This relatively long distance 140B provides for a relatively rigid connection.

The interior screw threading 122 may be positioned around the external screw threading 120 of the handle rod 102. By rotating the external screw threading 120 around the interior screw threading 122, the handle rod 102 and the middle rod 104 may become attached.

The second end 114 of the middle rod 104 may include a connector such as external screw threading 124 or any other connector as described above. The external screw threading 124 may also be relatively fine, similar to the external screw threading 120 of the handle rod 102. The external screw threading 124 may extend for a distance 140C from the second end 114 of the middle rod 104. This distance 140C may be, for example, two to three inches.

In some embodiments, multiple middle rods 104 may be provided. For example, two, three, four, or any other quantity of middle rods 104 may be attached together to form one larger middle rod.

The middle rod 104 may have a length 105. This length 105 may be between 2 feet and 8 feet (0.61 m and 2.4 m). Multiple middle rods 104 may be provided having different lengths. For example, one middle rod 104 may be provided having a length of two feet. Another middle rod 104 may be provided having a length of four feet. A third middle rod 104 may be provided having a length of six feet.

The device rod 106 may have a first end 116 and a second end 118. The first end 116 of the device rod may include a connector. The connector may be internal screw threading 126 or any other connector as described above.

The internal screw threading 126 may extend for a distance 140D from the first end 116 of the device rod 106. This distance 140D may be between two and three inches. This distance provides a relatively rigid connection between the interior screw threading 126 and the external screw threading 124 of the middle rod 104. The internal screw threading 126 may also be relatively fine.

The second end 118 of the device rod 106 may be adapted to attach to a device such as a net, a brush, a vacuum, etc. The second end 118 of the device rod 106 may include a connector 128 that is adapted to attach to the device. The connector 128 may be any type of connector, such as screw threading, any snap connector including but not limited to those illustrated in FIG. 5, other connectors including but not limited to those illustrated in FIGS. 8A-8I, spring clips, pressure locks, cam locks, or the like.

The device rod 106 may have a diameter 138. The diameter 138 may be relatively equal to (i.e., within 5 percent of or within 10 percent of) the diameter 136 of the middle rod 104 and the diameter 134 of the handle rod 102. By providing relatively equal diameters for each of the rods 102, 104, 106, the pole 100 may be more resistant to bending than if each of the rods 102, 104, 106 have varying diameters.

In some embodiments, multiple handle rods 102, multiple middle rods 104, and multiple device rods 106 may be provided. One set of rods may have a diameter of one half inch, another set of rods may have a diameter of one inch, and another set of rods may have a diameter of two inches. A user may select a set of rods having a preferred diameter for any given use. For example, a user may select a set of rods having a diameter of one half inch for use with a skimmer and may select another set of rods having a diameter of one inch for use with a pool rake.

The device rod 106 may have a length 107. The length 107 may be between two and six feet. The lengths 103, 105 and 107 may each be the same or may be different.

Figure 1B:
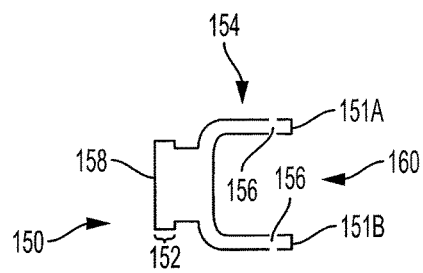
FIG. 1B illustrates an adapter for attaching the modular pole of FIG. 1A to a pool device according to an embodiment of the invention.
Figure 1C:
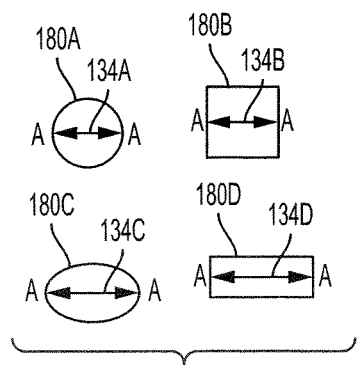
FIG. 1C illustrates four exemplary cross-sections of a handle rod of a modular pole according to various embodiments of the invention.

FIG. 1B illustrates an adapter 150. Referring to FIGS. 1A and 1B, the device rod 106 may be adapted to attach to the adapter 150 via the connector 128. The adapter 150 in turn may be adapted to attach to a device. More than one adapter 150 may be provided. For example, an adapter 150 may be provided for each device that the pole 100 may connect to. The adapter 150 may be adapted to attach to multiple devices.

The adapter 150 includes a first end 158 and a second end 160. The first end of the adapter 150 includes a connector 152. The connector 152 may include screw threading, any snap connector including but not limited to those illustrated in FIG. 5, other connectors including but not limited to those illustrated in FIGS. 8A-8I, spring clips, pressure locks, cam locks, or the like. The connector 152 may be adapted to attach to the connector 128 of the device rod 106.

The second end 160 of the adapter 150 includes a device connector 154. The device connector 154 may include screw threading, any snap connector including but not limited to those illustrated in FIG. 5, other connectors including but not limited to those illustrated in FIGS. 8A-8I, spring clips, pressure locks, cam locks, or the like. The device connector 154 may be adapted to attach to the device.

In FIG. 1B, the device connector 154 includes two prongs 151, each having openings 156. The two prongs 151 may enclose a portion of the device and a pin (not illustrated) may be inserted through the openings 156. The pin may attach the device connector 154 to the device.

The adapter 150 may be used to connect the pole 100 to a device having a connector that is incompatible with the connector 128 of the device rod 106. In that regard, the device connector 154 may include a connector that is compatible with the device.

Figure 2:
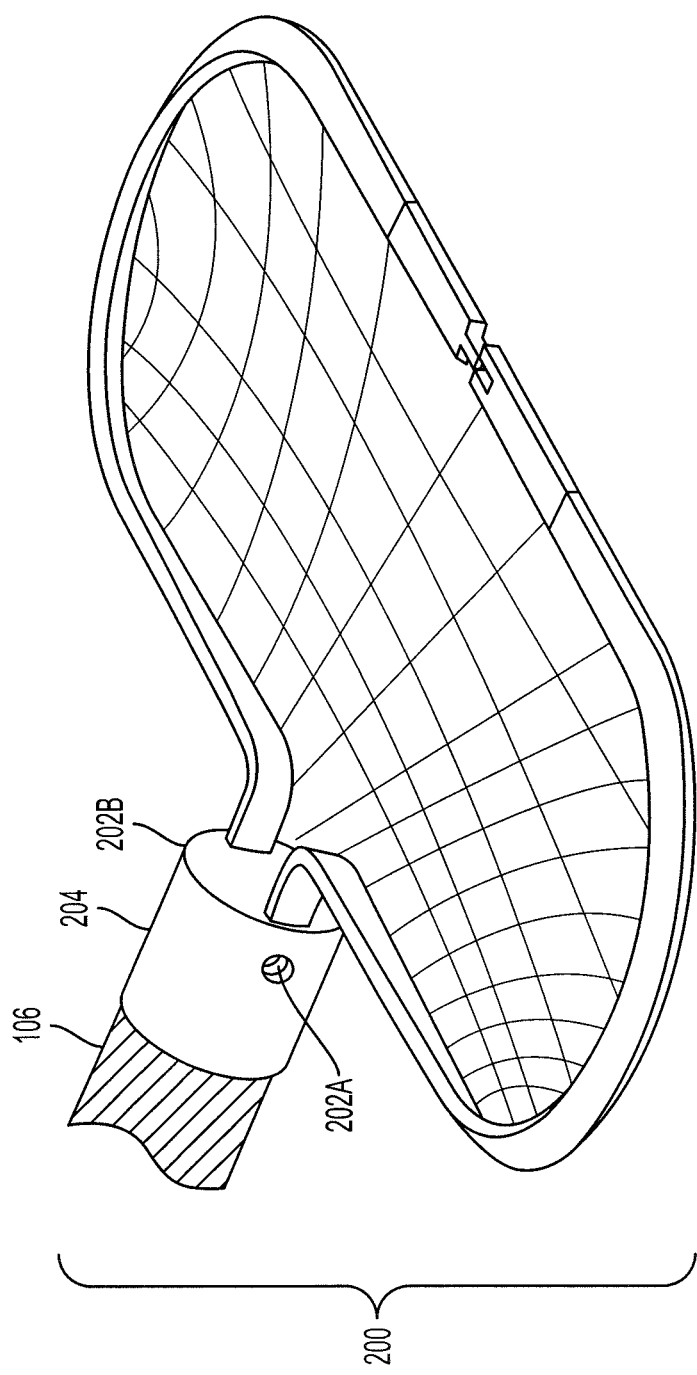
FIG. 2 illustrates a pool net 200 adapted to attach to a device rod of a modular pole according to an embodiment of the invention.

FIG. 2 illustrates a pool net 200 adapted to the device rod 106. Referring to FIGS. 1A and 2, the pool net 200 may have an end 204 that is adapted to attach to the device rod 106. The end 204 may include holes 202A and 202B. The second end 118 of the device rod 106 may include spring loaded protrusions that are adapted to fit into the holes 202. When the device rod 106 is positioned within the end 204 such that the spring loaded protrusions line up with the holes 202, the protrusions extend through the holes 202, thus attaching the device rod 106 to the pool net 200.

The device rod 106 may instead include a hole where the protrusions would be. In this embodiment, a pin or the like may be inserted through the holes 202 of the end 204 and through the hole of the device rod 106. The pin may be held in place by a device or devices external to the holes 202. The pin may thus attach the device rod 106 to the pool net 200.

Figure 3:
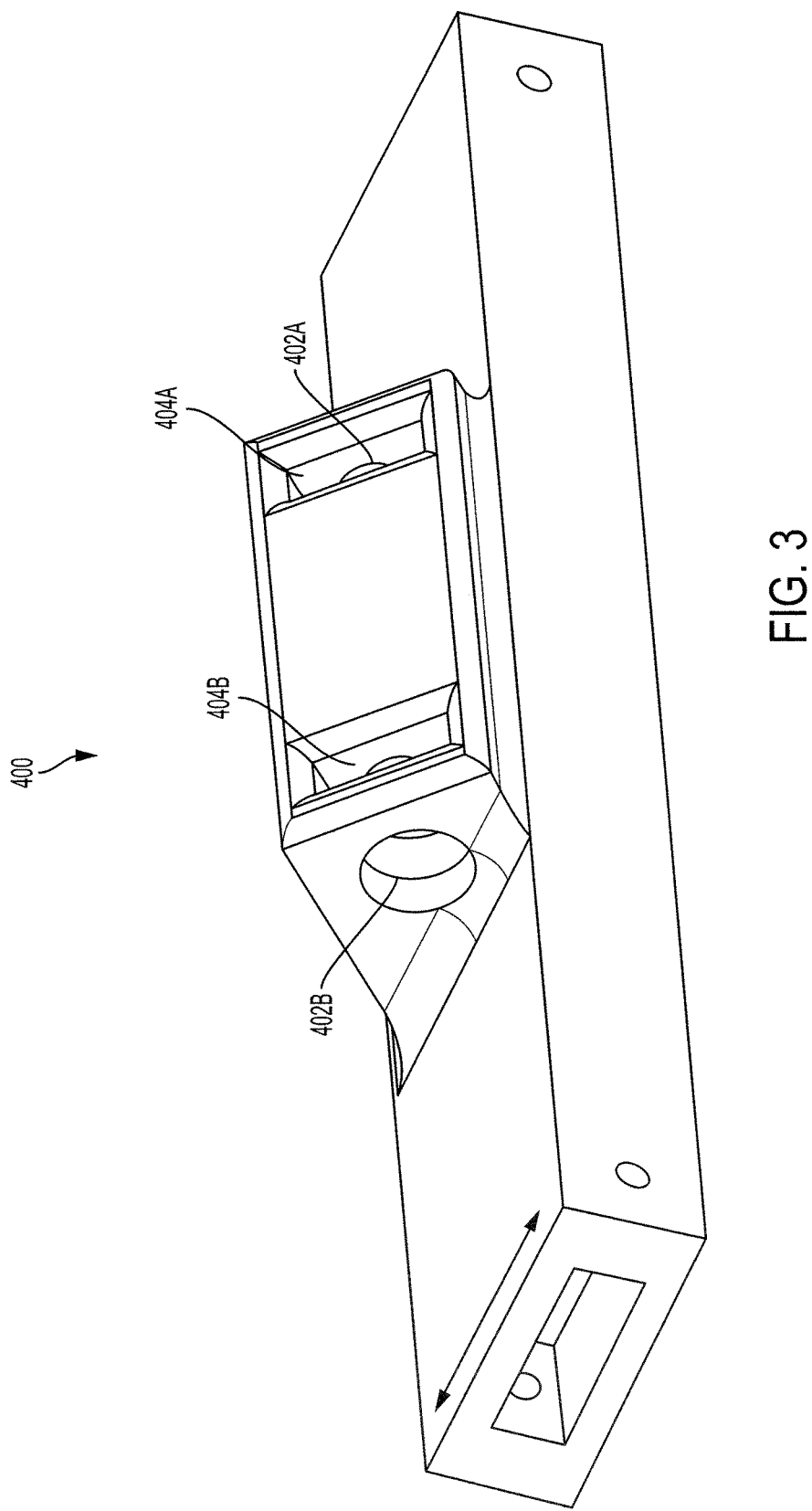
FIG. 3 illustrates a brush adapted to attach to a modular pole or an adapter for use with a modular pole according to an embodiment of the invention.

FIG. 3 illustrates a brush 400. Referring to FIGS. 1B and 3, the brush 400 may include an end 401 that is adapted to attach to the adapter 150. The prongs 151 of the adapter 150 are configured to insert into openings 404 at the top 401 of the brush 400. The openings 156 of the adapter 150 may line up with the holes 402 of the brush 400. A pin may be inserted through the holes 402 and the openings 156, thus attaching the brush 400 to the adapter 150.

Figure 4:
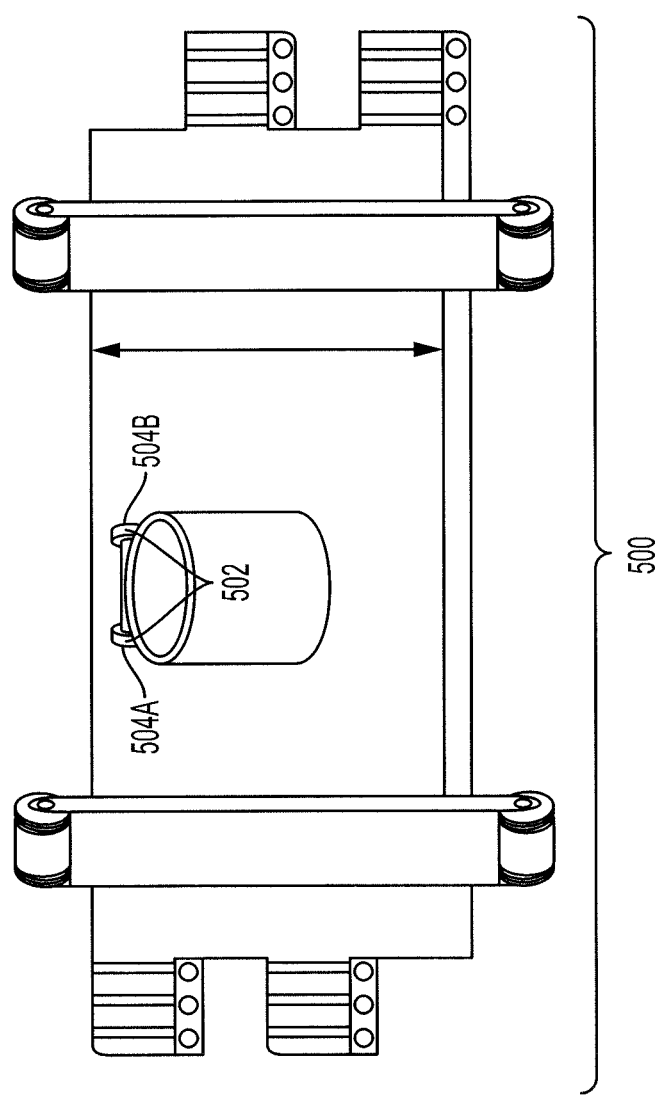
FIG. 4 illustrates a pool vacuum adapted to attach to a modular pole or an adapter for use with a modular pole according to an embodiment of the invention.

Referring to FIGS. 1B and 4, a pool vacuum 500 includes two protrusions 502. The protrusions 502 may be adapted to attach to the adapter 150.

The protrusions 502 of the pool vacuum 500 may be positioned inside the prongs 151 of the adapter 150. The protrusions 502 include holes 504A and 504B. The holes 504 may line up with the openings 156 of the adapter 150. A pin may be inserted through the holes 504 and the openings 156. This pin may lock in place and connect the pool vacuum 500 to the adapter 150.

Figure 6:
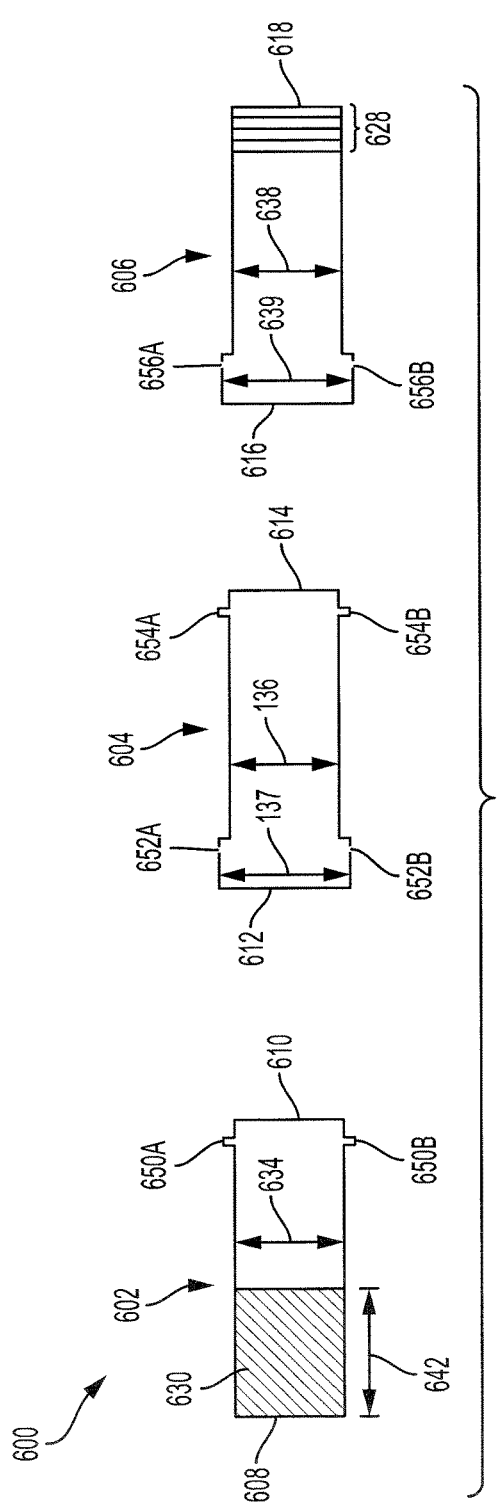
FIG. 6 illustrates a modular pole that utilizes pressure locks to couple the various rods together according to an embodiment of the invention.

FIG. 6 illustrates another modular pole 600. The pole 600 includes the handle rod 602, the middle rod 604, and the device rod 606. The handle rod 602 has a first end 608 and a second end 610. The first end 608 of the handle rod 602 includes gripping material 630. The gripping material 630 extends for a distance 642 from the first end 108 of the handle rod 602. The first distance 642 may be at least six inches. Because the distance 642 of the gripping material 630 is at least six inches, two full-size human hands may grip the gripping material 630. If the gripping material 630 is less than six inches, it may be difficult for two human hands to grip the gripping material 630.

As illustrated, the second end 610 of the handle rod 602 includes a protrusion 650A and a protrusion 650B. In some embodiments, more than two protrusions 650 may be provided. The protrusions 650 may be spring loaded such that they compress towards the surface of the handle rod 602 as force is applied. The handle rod 102 has a first diameter 134.

The middle rod 104 has a first end 612 and a second end 614. The first end 612 of the middle rod 104 may include an opening 652A and an opening 652B.

The first end 612 of the middle rod 604 may have a diameter 637 that is larger than a diameter 636 of the rest of the middle rod. This allows for the connecting part, or the first end 112, of the middle rod to be positioned radially outward from the second end 110 of the handle rod 602. The first end 612 of the middle rod 604 may be adapted to slide over the second end 610 of the handle rod 602. Because the protrusions 650 may be spring loaded, the protrusions may be compressed towards a center of the handle rod 602 while the first end 612 of the middle rod 604 is positioned around the handle rod 602. When the first end 612 is positioned over the second end 610, the protrusions 650 may be aligned with the openings 652. When the protrusions 650 align with the openings 652, the protrusions will extend into the openings 652, attaching the first end 612 of the middle rod 604 to the second end 610 of the handle rod 602.

A diameter 636 of the middle rod 604 may be substantially the same as the diameter 634. As illustrated, the diameter 637 of the first end 612 of the middle rod 604 is larger than the diameters 634, 636 throughout the rest of the handle rod 602 and the middle rod 604. By allowing the first end 612 of the middle rod to have the diameter 637 that is larger than the diameter 636, the diameter 634 and the diameter 636 can be substantially equal.

The middle rod 604 may have a second end 614. The second end 614 may include protrusions 654 similar to the protrusions 650 of the handle rod 102.

The device rod 606 may have a first end 616 and a second end 618. The device rod 606 has a diameter 138 that is the same as the diameter 634 of the handle rod 602 and the diameter 636 of the middle rod 604.

The first end 616 of the device rod 606 may have a diameter 639 that is greater than the diameter 638 of the rest of the device rod 606. This allows the first end 616 of the device rod 606 to be positioned outward from the second end 614 of the middle rod 604 and extend over the second end 614 of the middle rod 604. The protrusions 654 may then extend into openings 656 and attach the middle rod 604 to the device rod 606.

The device rod 606 may have a device connector 628 positioned on the second end 618 of the device rod 606. The device connector 628 may be adapted to attach to the adapter 150 of FIG. 1B or to a pool device.

Multiple device rods 606 may be provided. Each device rod 606 may have a different device connector 628 such that each device rod 606 can connect to a device having a different type of connector.

Figure 7:
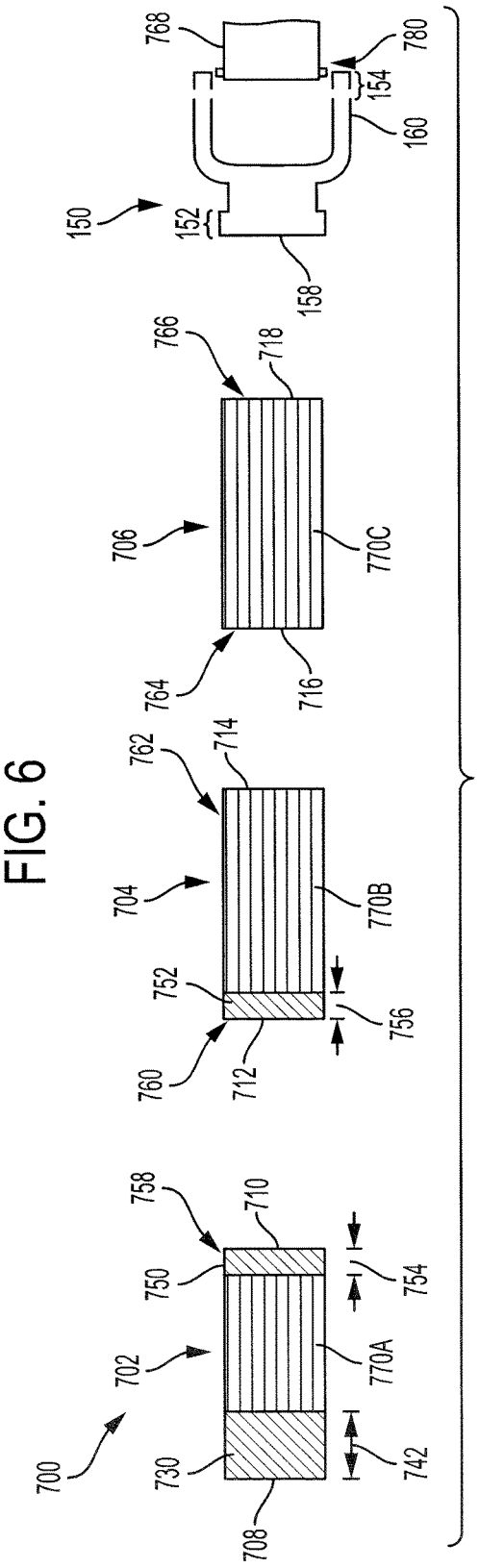
FIG. 7 illustrates a modular pole having a ribbed exterior according to an embodiment of the invention.

FIG. 7 illustrates another embodiment of a pole 700. A handle rod 702, a middle rod 704, and/or a device rod 706 may include ribbing 770 on an external surface for increased strength (i.e., increased resistance to bending). In some embodiments, the external surface of the handle rod 702, the middle rod 704, and/or the device rod 706 may be corrugated instead of ribbed.

As illustrated, the handle rod 702 includes a first end 708 and a second end 710. The first end 708 of the handle rod 702 may include gripping material 730. The gripping material 730 may have a distance 742. The distance 742 may be at least three inches long. This three inch distance 742 ensures that the gripping material 730 is large enough for an entire human hand to grip the gripping material 730.

The second end 710 of the handle rod 702 may include a connector 758. The connector 758 may be any type of connector. For example, the connector 758 may include screw threading, a snap connector including but not limited to those illustrated in FIG. 5, other connectors including but not limited to those illustrated in FIGS. 8A-8I, spring clips, pressure locks, cam locks or the like. The second end 710 may also include gripping material 750. The gripping material 750 may extend for a length 754 from the second end 710 of the handle rod 702. The length 754 may be at least 1.5 inches.

The middle rod 704 has a first end 712 and a second end 714. The first end 712 may include a first connector 760. The first connector 760 may be any type of connector suitable for attaching two rods together as described above. The first connector 760 is adapted to attach the middle rod 704 to the handle rod 702 via the connector 758.

The first end 712 of the middle rod 704 may also include gripping material 752. The gripping material 752 may have a length 756. The length 756 may be at least 1.5 inches. When the connector 758 of the handle rod 702 is attached to the first connector 760 of the middle rod 704, the gripping material 750 may be positioned adjacent to the gripping material 752. In this scenario, the total length of the gripping material 750, 752 may be at least three inches. This allows at least one human hand to grip the gripping material 750, 752.

The second end 714 of the middle rod 704 may include a second connector 762. The second connector 762 may be any type of connector as described above.

The device rod 706 may include a first end 716 and a second end 718. The first end 716 may include a first connector 764. The first connector 764 may be any type of connector as described above. The first connector 764 is adapted to attach the device rod 706 to the middle rod 704 via the second connector 762.

The second end 718 of the device rod 706 may include a second, or device, connector 766. The device connector 766 may include any type of connector as described above.

The device connector 766 may be designed to connect to the adapter 150. As shown, the first end 158 of the adapter 150 includes the connector 152. The connector 152 is adapted to attach the adapter 150 to the device connector 766 of the device rod 706.

The second end 160 of the adapter 150 may include a device connector 154. The device connector 154 may include any connector as described above. The device connector 154 is adapted to attach the adapter 150 to a device 768.

Also illustrated is a portion of the device 768. The device 768 may include a connector 780. The connector 780 may be any type of connector. The connector 780 of the device 768 may be adapted to attach to the device connector 154 of the adapter 150. In some embodiments, the device 768 may be adapted to attach directly to the device rod 106 without use of the adapter 150.

FIG. 8A illustrates a clutch-style lock between the handle rod 102 and the middle rod 104. The clutch-style lock includes a clutch 900. When the clutch 900 is rotated about an axis of the handle rod 102, the handle rod 102 is attached to the middle rod 104.

FIG. 8B illustrates a set knob lock between the first middle rod 104A and the second middle rod 104B. The set knob lock includes a knob 902. When the knob 902 is rotated about an axis of the knob 902, the first middle rod 104A is attached to the second middle rod 104B.

FIG. 8C illustrates a snap collar lock between the handle rod 102 and the middle rod 104. The snap collar lock includes a snap feature 904. When the snap feature 904 is engaged (i.e., rotated about an axis of the handle rod 102), the handle rod 102 is attached to the middle rod 104.

FIG. 8D illustrates a split collar lock between the handle rod 102 and the middle rod 104. The split collar lock includes a knob 906. When the knob 906 is rotated about an axis of the knob 906, the handle rod 102 is attached to the middle rod 104.

FIG. 8E illustrates a spring button lock between the handle rod 102 and the middle rod 104. The spring button lock includes a hole 910 positioned within the handle rod 102 or the middle rod 104, and a pressure-pin 908 positioned on the other of the handle rod 102 or the middle rod 104. The pressure-pin 908 may be depressed while the rod with the hole 910 is placed over the pressure-pin 908. When the pressure-pin 908 is released, it extends into the hole 910, thus connecting the handle rod 102 to the middle rod 104.

FIG. 8F illustrates an internal cam lock between the device rod 106 and the adapter 150. A cam lock is positioned within the device rod 106 and/or an adapter 950. When either the device rod 106 or the adapter 950 is rotated about its respective axis, the device rod 106 will be attached to the adapter 950.

Figure 8G:
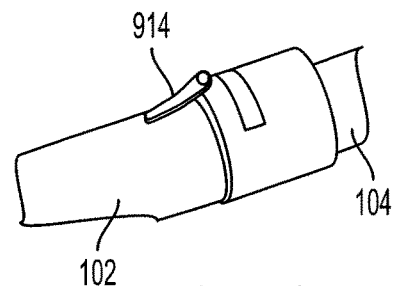
FIG. 8G illustrates a illustrates a snap collar lock that is adapted to attach two rods of a modular pole together according to an embodiment of the invention.

FIG. 8G illustrates another snap collar lock between a handle rod 102 and a middle rod 104. The snap collar lock includes a snap feature 914. When the snap feature 914 is rotated towards the middle rod 104 from the handle rod 102, the handle rod 102 will be attached to the middle rod 104.

Figure 8H:
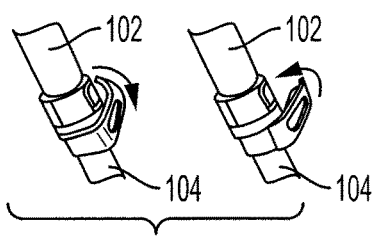
FIG. 8H illustrates another snap collar lock that is adapted to attach two rods of a modular pole together according to an embodiment of the invention.

FIG. 8H illustrates another snap collar lock between a handle rod 102 and a middle rod 104. The snap collar lock includes a snap feature 916. When the snap feature 916 is rotated towards an axis of the handle rod 102 and the middle rod 104, the snap collar locks the handle rod 102 to the middle rod 104.

Figure 8I:
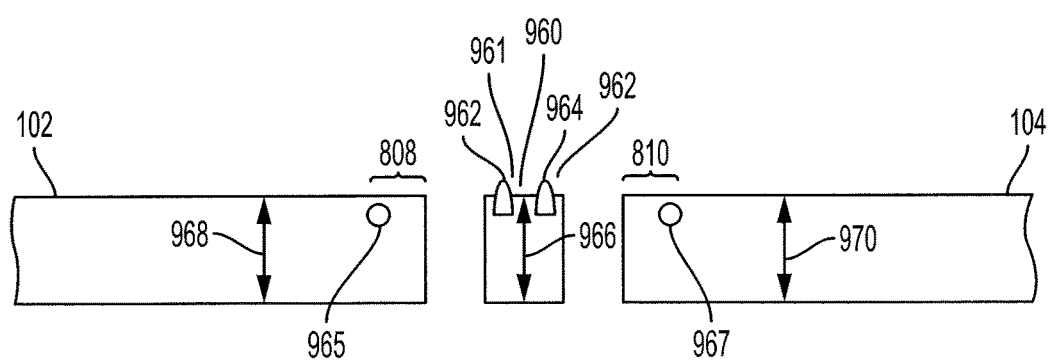
FIG. 8I illustrates a bushing connector that is adapted to attach two rods of a modular pole together according to an embodiment of the invention.

FIG. 8I illustrates a handle rod 102 having a handle connector 758, a middle rod 104 having a first connector 760, and a bushing 960 having a first connector 961 and a second connector 963. In the embodiment illustrated in FIG. 9I, the first connector 961 and the second connector 963 are female and the handle connector 758 and the first connector 760 are male. In some embodiments, the first connector 961 and the second connector 963 are male and the handle connector 758 and the first connector 760 are female.

In the embodiment illustrated in FIG. 9I, the connectors are pressure-pin style connectors. The handle connector 758 includes a hole 965 and the first connector 760 includes a hole 967. The handle connector 758 and the first connector 760 may include any number of holes that can reasonably be positioned around the respective rods. The first connector 961 includes a pressure-pin 962 and the second connector 963 includes a pressure-pin 962. The first connector 961 and the second connector 963 may include any number of pressure-pins that can reasonably be positioned around the bushing 960, and in preferred embodiments, the number of pressure-pins within the first connector 961 and the second connector 963 is equal to the number of holes within the handle connector 758 and the first connector 760.

The handle rod 102 has a diameter 968 that may span the length of the handle rod 102. The middle rod 104 has a diameter 970 that may span the length of the middle rod 104 and be substantially equal to the diameter 968. The bushing 960 has a diameter 966 that may span the length of the bushing 960 and be smaller than the diameter 968 and 970. The pressure-pins 962 and 964 may be depressed so that they are substantially flush with the bushing 960. The bushing 960 may then be partially inserted into the handle rod 102 and the middle rod 104 and pressure may be relieved from the pressure-pins 962 and 964. When the pressure-pin 962 aligns with hole 965, the pressure-pin 962 protrudes through the hole 965 to attach the bushing 960 to the handle rod. When the pressure-pin 964 aligns with hole 967, the pressure-pin 964 protrudes through the hole 967 to attach the bushing 960 to the middle rod 104.

Because the diameter 966 of the bushing is smaller than the diameter 968 of the handle rod 102 and the diameter 970 of the middle rod 104, the diameter 968 and the diameter 970 may be equal. This allows the combination of the handle rod 102 and the middle rod 104 to have a greater resistance to bending than if the diameter 968 and the diameter 970 were different. Additionally, because the diameter 966 of the bushing is smaller than the diameter 968 of the handle rod 102 and the diameter 970 of the middle rod 104, the bushing may be positioned in an interior cavity of the handle rod 102 and the middle rod 104. This prevents extension of any protrusions beyond the exterior of the connections, which may reduce the likelihood of injury due to contact with a rough or sharp protrusion.

Figure 9:
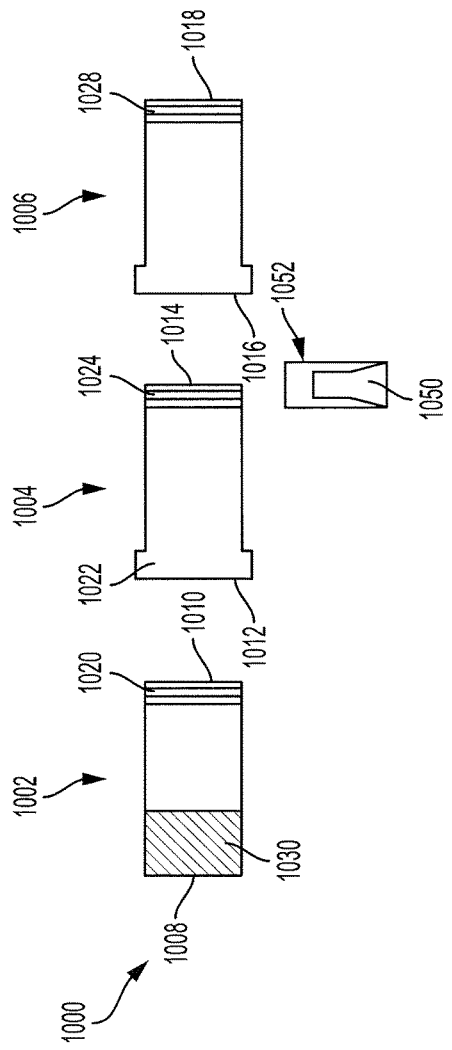
FIG. 9 illustrates a modular pole that includes a securing mechanism according to an embodiment of the invention.

FIG. 9 illustrates another pole 1000 that includes a securing mechanism 1050. The handle rod 1002 includes a first end 1008 and a second end 1010. The first end 1008 includes gripping material 1030. The second end 1010 includes external screw threading 1020.

The middle rod 1004 has a first end 1012 and a second end 1014. The first end 1012 includes internal screw threading 1022. The second end 1014 includes external screw threading 1024.

The device rod 1006 has a first end 1016 and a second end 1018. The first end 1016 includes internal screw threading 1026. The second end 1018 includes a connector 1028.

It may be desirable for the pole 1000 to be relatively rigid. Increased rigidity, as described above, may be achieved by providing a substantially similar diameter throughout a length of a pole as well as by providing relatively fine and relatively long threading. The rigidity of the pole 100 may be further increased by further securing the connections between the rods using a securing mechanism 1050.

The securing mechanism 1050 may be provided to secure the connection between the external screw threading 1024 and the internal screw threading 1026. The securing mechanism 1050 may also be provided to secure the connection between external screw threading 1020 and internal screw threading 1022. In some embodiments, a securing mechanism may be provided for all connections including between two rods, between a rod and a handle, between a rod and a device, or the like.

The securing mechanism 1050 may be adapted to fit over the connection between the external screw threading 1024 and the internal screw threading 1026. In some embodiments, a securing mechanism 1050 may be adapted to fit over any other connector or connector pair.

The securing mechanism 1050 may be adapted to secure the connection. For example, the securing mechanism 1050 illustrated in FIG. 9 includes a lever 1052. The securing mechanism 1050 may be placed over the connection between the middle rod 1004 and the device rod 1006 and fit relatively loosely about the connection. When the lever 1052 is engaged, the securing mechanism 1050 may fasten to both the middle rod 1004 and the device rod 1006, securing the connection between the rods.

A handle rod, a middle rod and a device rod may not all be necessary for a usable pole. For example, a short pole may be desirable in various situations. A handle rod and a device rod may be coupled together to form a relatively short pole. In some embodiments, a device rod may attach to a device without any additional rods to form an even shorter pole.

Figure 10:
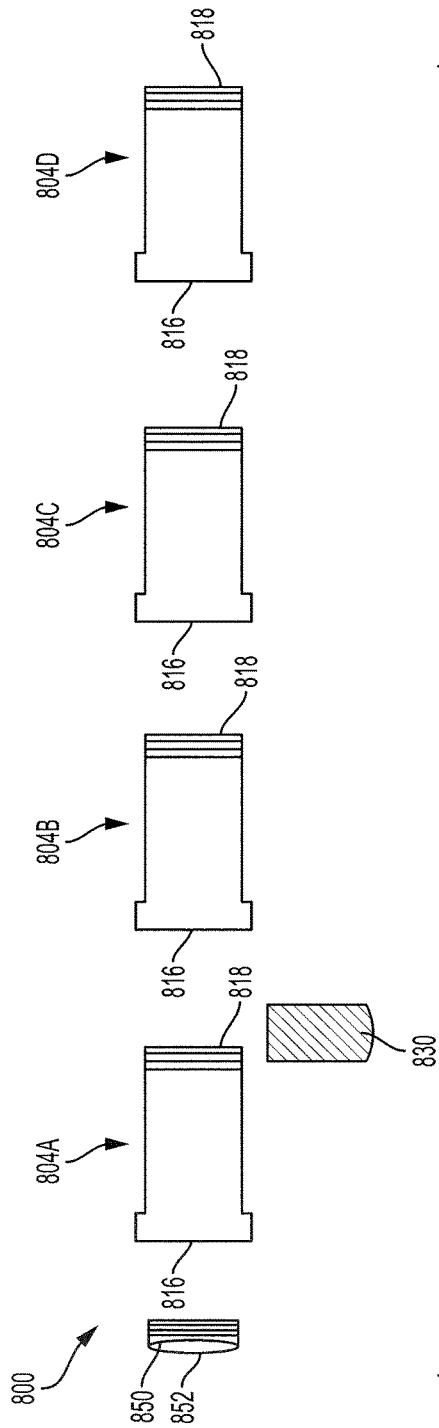
FIG. 10 illustrates a modular pole that includes four middle rods coupled together according to an embodiment of the invention.

FIG. 10 illustrates a pole 800 that includes no handle rod or device rod. The embodiment illustrated in FIG. 10 includes four middle rods 804. As illustrated, a second end 818 of a first middle rod 804A may attach to a first end 816 of a second middle rod 804B. The second end 818 of the second middle rod 804B may attach to the first end 816 of the middle rod 804C. The second end 818 of the middle rod 804C may attach to the first end 816 of the middle rod 804D. The second end 818 of the middle rod 804D may be adapted to attach to a device or to an adapter, such as the adapter 150 of FIG. 1B.

In some embodiments, gripping material 830 may be provided. In some embodiments, more than one gripping material 830 may be provided. The gripping material 830 may be positioned anywhere along the pole 800. The gripping material 830 may be designed to slide onto the pole 800 and fasten to the pole 800 at any location.

In some embodiments, the pole 800 may further include an end cap 850. The end cap 850 may be adapted to attach to the first end 816 of the first middle rod 804A in any manner, such as screw threading, snap connectors including but not limited to those illustrated in FIG. 5, other connectors including but not limited to those illustrated in FIGS. 8A-8I, press-fit designs, or the like.

The end cap 850 may include a smooth end 852. The smooth end 852 may reduce the likelihood of injury to a user as a result of sharp edges of the first middle rod 804A, and may reduce the likelihood of debris entering the first middle rod 804A.

Figure 11B:
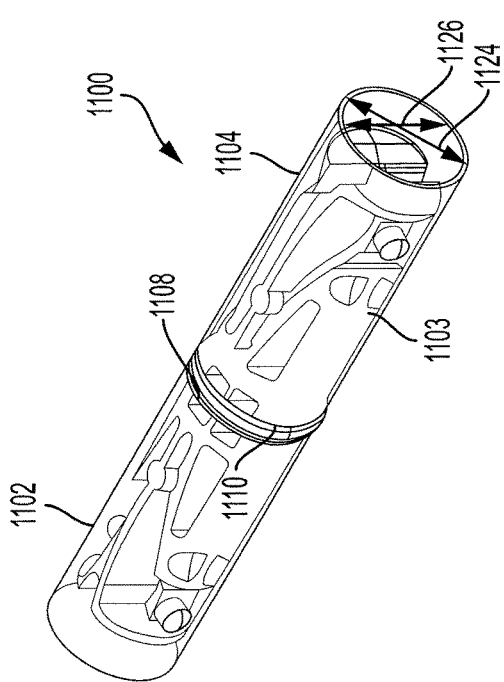
Figure 11C:
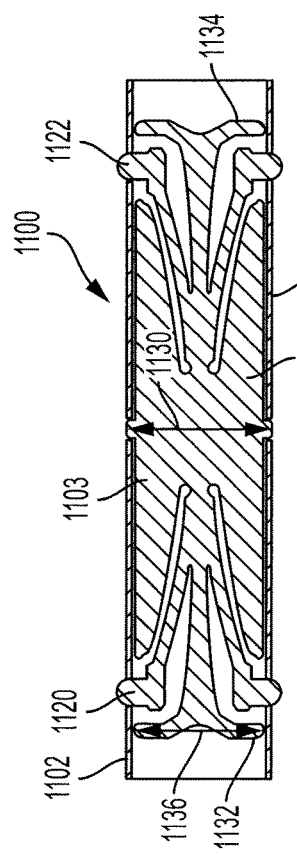

Referring now to FIGS. 11A through 11C, a modular pole 1100 may include a first tube 1102, a second tube 1104, and a tube connector 1103. FIG. 11A illustrates an entire length of each of the first tube 1102 and the second tube 1104, and FIGS. 11B and 11C illustrate a portion of the first tube 1102 and of the second tube 1104.

The first tube 1102 may include a first end 1106 and a second end 1108. The second tube 1104 may include a first end 1110 and a second end 1112. The second end 1108 of the first tube 1102 may define a first through-hole 1114. Stated differently, the first through-hole 1114 may be located closer to the second end 1108 than the first end 1106. Similarly, the first end 1110 of the second tube 1104 may define a second through-hole 1116.

In some embodiments, the second end 1112 of the second tube 1104 may include a device connector 1118. The device connector 1118 may be designed to be attached to a pool device or to an adapter, such as the adapter 150 of FIG. 1B. In some embodiments, the first end 1106 of the first tube 1102 may include a gripping material. Accordingly, the first tube 1102 may be regarded as a handle rod and the second tube 1104 and may be regarded as a device rod. In some embodiments, the first tube 1102 may include a second through-hole defined on the first end 1106 and/or the second tube 1104 may include a second through-hole defined on the second end 1112. In that regard, multiple tubes may be joined together via multiple tube connectors such that three or more tubes may be coupled together to form a modular pole.

The second tube 1104 may have an outer diameter 1124. The outer diameter 1124 of the second tube 1104 may be the same as an outer diameter of the first tube 1102. In that regard, because the diameters of the first tube 1102 and the second 1104 are substantially the same (i.e., within 5 percent, or within 10 percent of each other) the modular pole 1100 may have a greater resistance to bending than if each of the tubes 1102, 1104 had different diameters.

The tube connector 1103 may be integral and may include a main body 1105 coupled to various features. The tube connector 1103 may further include a first retractable protrusion 1120 and a second retractable protrusion 1122 each capable of being actuated towards an axis of the tube connector 1103. The tube connector 1103 may further include a rib 1128 extending radially outward from a center of the tube connector 1103. The tube connector 1103 may be designed such that the retractable protrusions 1120, 1122 apply a force away from the main body 1105.

A portion of the tube connector 1103 that includes the first retractable protrusion 1120 may be positioned within the first tube 1102. When the first retractable protrusion 1120 is aligned with the first through-hole 1114, the first retractable protrusion 1120 may extend through the first through-hole 1114. Likewise, a portion of the tube connector 1103 that includes the second retractable protrusion 1122 may be positioned within the second tube 1104. When the second retractable protrusion 1122 is aligned with the second through-hole 1116, the second retractable protrusion 1122 may extend through the second through-hole 1116.

When the first retractable protrusion 1120 is positioned within the first through-hole 1114 the tube connector 1103 may be coupled to the first tube 1102. Likewise, when the second retractable protrusion 1122 is positioned within the second through-hole 1116 the tube connector 1103 may be coupled to the second tube 1104. In that regard, the tube connector 1103 may be used to couple the first tube 1102 to the second tube 1104.

When the first tube 1102 is coupled to the second tube 1104 the rib 1128 may be positioned between the first tube 1102 and the second tube 1104. The rib 1128 may have a rib diameter 1130 that is substantially equal to the outer diameter 1124 of the first tube 1102 and the second tube 1104. In that regard, the diameter of the modular pole 1100 may remain substantially constant throughout a length of the modular pole 1100.

The tube connector 1103 may further include a first stabilizer 1132 configured to be positioned within the first tube 1102 and may include a second stabilizer 1134 configured to be positioned within the second tube 1104. The first stabilizer 1132 and the second stabilizer 1134 may each have a stabilizer diameter 1136. The stabilizer diameter 1136 may be substantially equal to an inner diameter 1126 of the first tube 1102 and the second tube 1104. The first stabilizer 1132 and the second stabilizer 1134 resist movement of the tube connector 1103 relative to the first tube 1102 and the second tube 1104.

In order to decouple the first tube 1102 from the tube connector 1103, the first retractable protrusion 1120 may be forced inside of the first tube 1102 via the first through-hole 1114. Similarly, in order to decouple the second tube 1104 from the tube connector 1103, the second retractable protrusion 1122 may be forced inside of the second tube 1104 via the second through-hole 1116.

Figure 12:
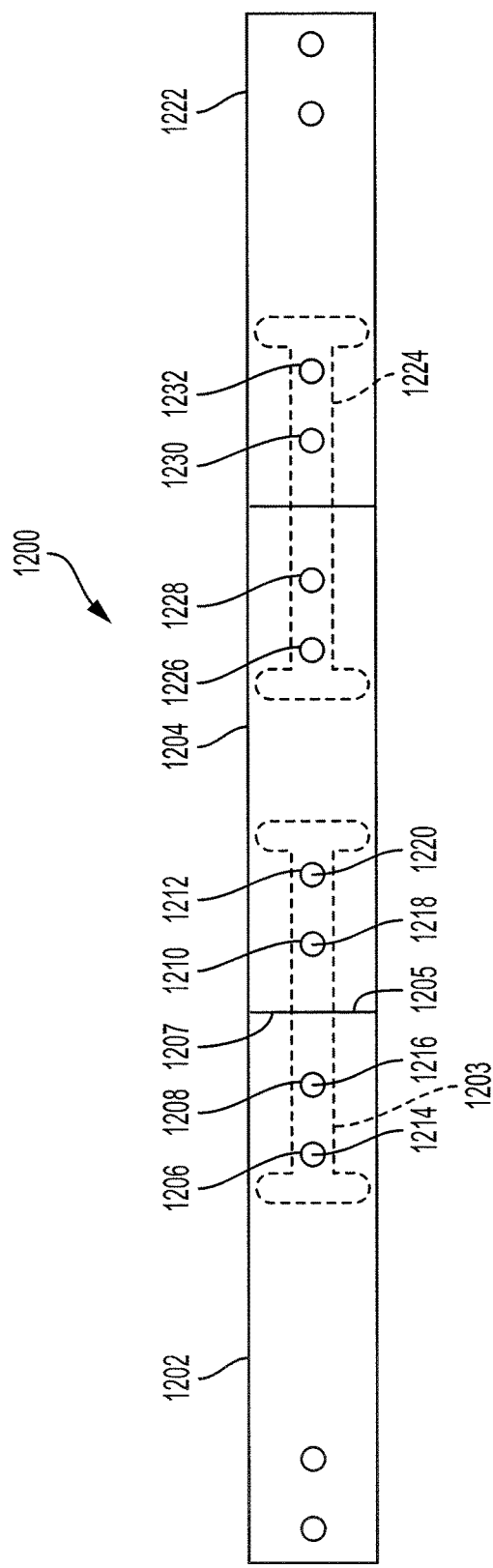
FIG. 12 illustrates a modular pole having three tubes coupled together via two internal tube connectors according to an embodiment of the invention.

Referring now to FIG. 12, another modular pole 1200 includes a first tube 1202 and a second tube 1204. The first tube 1202 includes two through-holes 1206, 1208 defined on a first end 1205 and the second tube 1204 includes two through-holes 1210, 1212 defined on a second end 1207. A tube connector 1203 may include 4 retractable protrusions 1214, 1216, 1218, 1220. The two retractable protrusions 1214, 1216 may be received by the through-holes 1206, 1208 of the first tube 1202, and the two retractable protrusions 1218, 1220 may be received by the through-holes 1210, 1212 of the second tube 1204. Inclusion of the two through-holes on each of the first tube 1202 and the second tube 1204, along with the corresponding retractable protrusions, may provide additional rigidity to the connection between the first tube 1202 and the second tube 1204.

In some embodiments, the modular pole 1200 may further include a third tube 1222 and a second tube connector 1224. The second tube 1204 may include an additional two through-holes 1226, 1228 on an opposite end of the second tube 1204 from the through-holes 1210, 1212. The third tube 1222 may include two through-holes 1230, 1232. The second tube connector 1224 may be used to couple the second tube 1204 to the third tube 1222 in a similar manner as the first tube connector 1203 is used to connect the first tube 1202 to the second tube 1204. Any number of tubes and tube connectors may be coupled together in this manner to form a modular pole having any desired length.

Figure 13A:
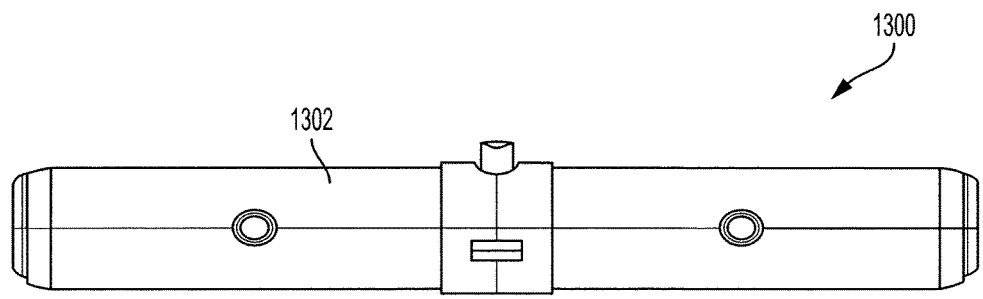
FIGS. 13A-13C illustrate a modular pole having two tubes coupled together via a pole connector that includes two V-clips and a button according to an embodiment of the invention.
Figure 13B:
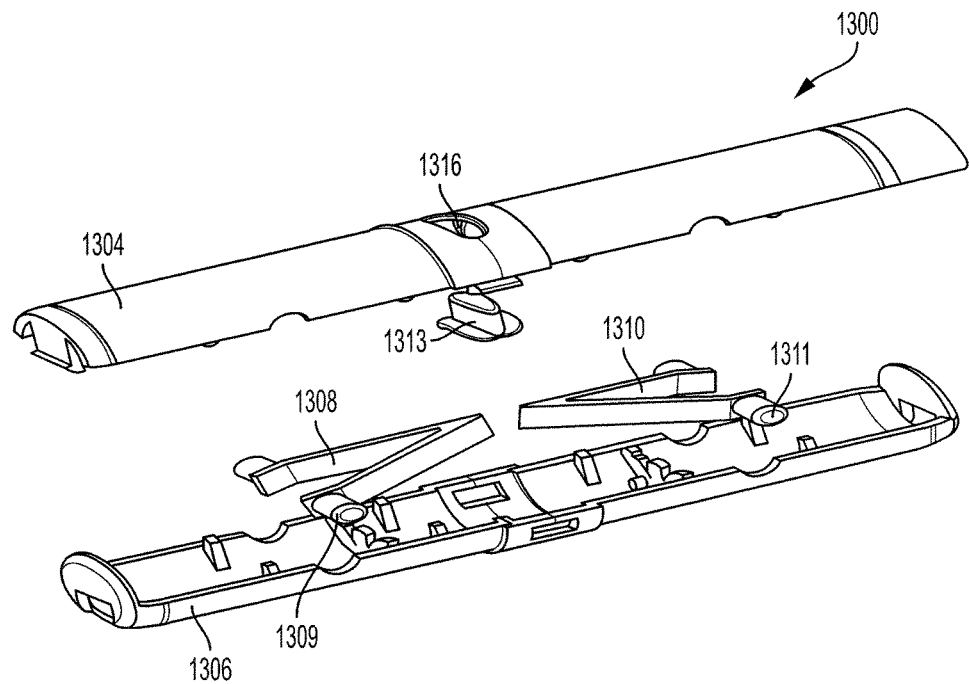
Figure 13C:
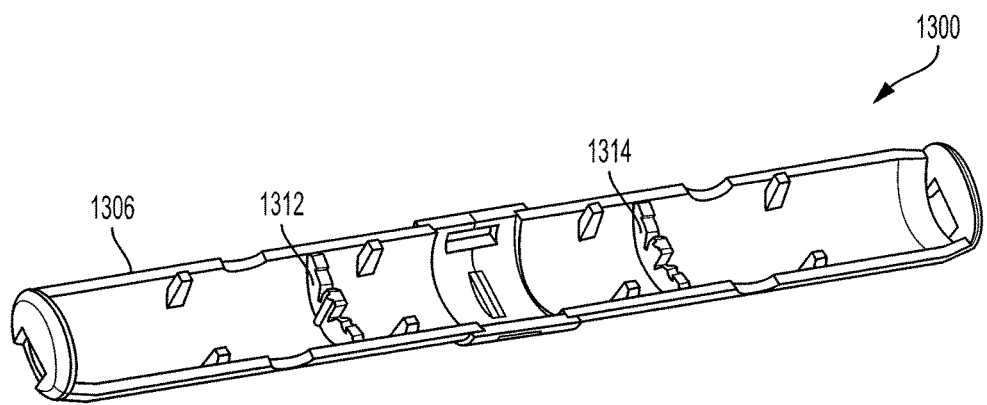

Turning to FIGS. 13A-13C, a tube connector 1300 may include a connector body 1302 having a first half 1304 and a second half 1306 that defines a cavity therebetween. The tube connector 1300 may further include a first V-clip 1308 that includes at least a first retractable protrusion 1309 and a second V-clip 1310 that includes at least a second retractable protrusion 1311.

One or both of the first half 1304 or the second half 1306 may include a first ramp 1312 and a second ramp 1314. The first V-clip 1308 may at least partially rest upon the first ramp 1312 and the second V-clip 1310 may at least partially rest upon the second ramp 1314. A button 1313 may be positioned on a portion of the first V-clip 1308 and the second V-clip 1310 and may extend through an opening 1316. When the button 1313 is pressed towards the V-clips 1308, 1310 the ramps 1312, 1314 may cause the ends of the V-clips 1308, 1310 to press together, thus drawing the first retractable protrusion 1309 and the second retractable protrusion 1311 inward (i.e., towards an axis of the tube connector 1300). In that regard, the tube connector 1300 may be used in place of the tube connector 1103 of FIG. 11A. In order to decouple the first tube 1102 and the second tube 1104 from the tube connector 1300, the button 1313 may be depressed, thus drawing the retractable protrusions 1309, 1311 in through the first through-hole 1114 and the second through-hole 1116.

Figure 14A:
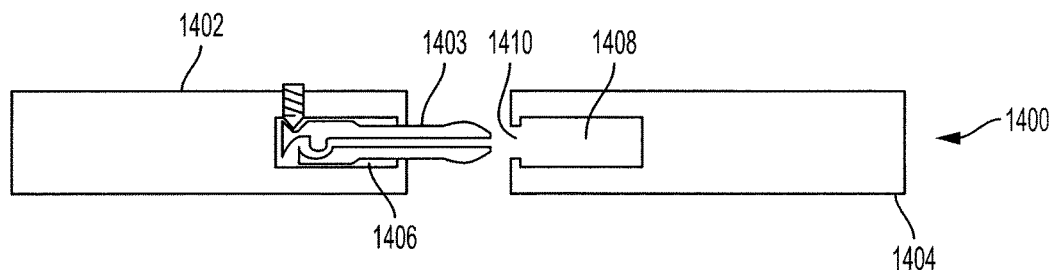
FIGS. 14A-14C illustrate a modular pole having two tubes coupled together via a pole connector that includes two portions coupled together in a hinged fashion according to an embodiment of the invention.
Figure 14B:
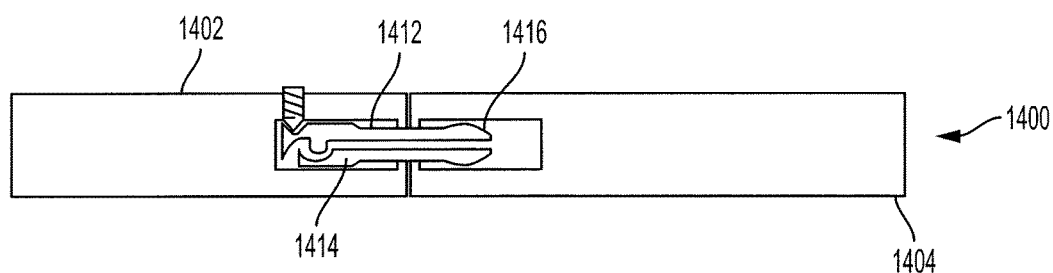
Figure 14C:
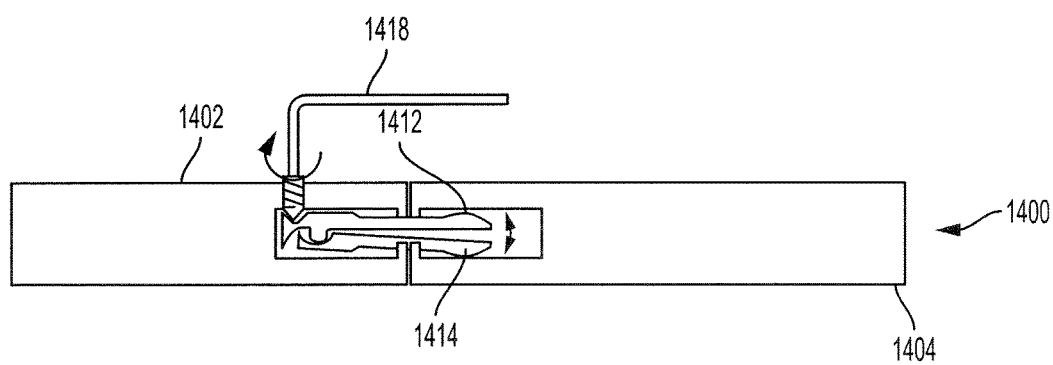

Referring now to FIGS. 14A-14C, a modular pole 1400 includes a first tube 1402, a second tube 1404, and a tube connector 1403. The first tube 1402 defines a first cavity 1406. The tube connector 1403 is partially positioned in the first cavity 1406. In some embodiments, the tube connector 1403 may be mechanically coupled to the first tube 1402. The second tube 1404 may define a second cavity 1408. The second cavity 1408 may include a mouth 1410 having a smaller diameter than the remainder of the second cavity 1408. In some embodiments, the cavities 1406, 1408 may extend a portion of, or the entire, length of the tubes 1402, 1404.

The tube connector 1403 may include a first portion 1412 and a second portion 1414 that are coupled together in such a manner as to provide hinging therebetween. The first portion 1412 and the second portion 1414 may be coupled together in such a manner that the first portion 1412 may rotate relative to the second portion 1414, thus causing the distal ends 1416 of the first portion 1412 and the second portion 1414 to separate from each other.

The distal end 1416 of the tube connector 1403 may be inserted into the second cavity 1408 via the mouth 1410. In order to couple the first tube 1402 to the second tube 1404 the tube connector 1403 may be manipulated to cause the distal ends 1416 to separate. For example, a tool 1418 may be used to cause such actuation of the tube connector 1403. When the distal ends 1416 are separated, a diameter of a portion of the tube connector 1403 near the distal end 1416 (i.e., a portion within the second cavity 1408) may be larger than a diameter of the mouth 1410. In that regard, the tube connector 1403 may be retained within the second cavity 1408 due to the mouth 1410 resisting separation of the tube connector 1403 from the second tube 1404.

Turning now to FIG. 15, another modular pole 1500 includes a first tube 1502, a second tube 1504, and a tube connector which may include a spring clip 1503. The first tube 1502 includes a first end 1506 and a second end 1508. A main portion 1505 defines the first end 1506 and a narrow portion 1507 defines the narrow end 1508. The second tube 1504 further includes a first end 1510 defined on a main portion 1509 and a narrow end 1512 defined on a narrow portion 1511. The main portion 1505 of the first tube 1502 has a diameter 1526 that is substantially equal to a diameter of the main portion 1509 of the second tube 1504. In some embodiments, the narrow end 1512 of the second tube 1504 may include a device connector 1528 capable of connecting the second tube 1504 to a pool device. In some embodiments, the second tube 1504 may have a constant diameter throughout and may thus not include the narrow portion 1511.

The narrow portion 1507 of the first tube 1502 includes a first through-hole 1514 and a second through-hole 1516. The main portion 1509 of the second tube 1504 defines a third through-hole 1522 and a fourth through-hole 1524. The narrow portion 1507 of the first tube 1502 is designed to fit inside of the main portion 1509 of the second tube 1504 such that the first and second through-holes 1514, 1516 align with the third and fourth through-holes 1522, 1524.

The spring clip 1503 may include a first retractable protrusion 1518 and a second retractable protrusion 1520. In some embodiments, the first tube may only include one of the through-holes 1514, 1516, the second tube 1504 may only include one of the through-holes 1522, 1524, and the spring clip 1503 may only include one of the retractable protrusions 1518, 1520. When the through-holes 1514, 1516 are aligned with the through-holes 1522, 1524 the retractable protrusions 1518, 1520 may extend through each of the through-holes 1514, 1516, 1522, 1524, thus coupling the first tube 1502 to the second tube 1504. In order to decouple the first tube 1502 from the second tube 1504 the retractable protrusions 1518, 1520 may be depressed such that they no longer extend through the through-holes 1522, 1524 of the second tube 1504 and the second tube 1504 may be separated from the first tube 1502.

Figure 16A:
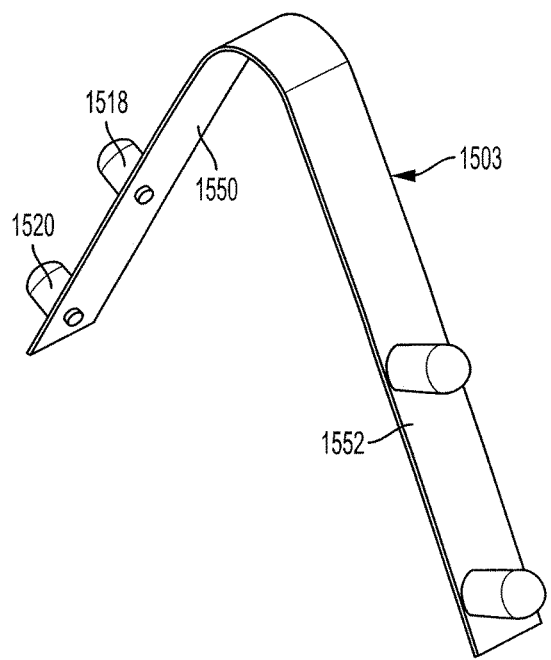
FIGS. 16A-16C illustrate various spring clips that may be used to couple the tubes of FIG. 15 together according to an embodiment of the invention.

Turning to FIG. 16A, the spring clip 1503 is shown with additional detail. The spring clip 1503 includes a first leg 1550 and a second leg 1552. The spring clip 1503 may be designed such that the first leg 1550 springs away from the second leg 1552. In that regard, when the first leg 1550 is actuated towards the second leg 1552, the spring clip 1503 exerts a force that forces the first leg 1550 from the second leg 1552. In that regard and referring to FIGS. 15 and 16A, the retractable protrusions 1518, 1520 may be retracted through the through-holes 1522, 1524 by exerting a force on the retractable protrusions 1518, 1520 in a direction towards the second leg 1552.

Figure 16B:
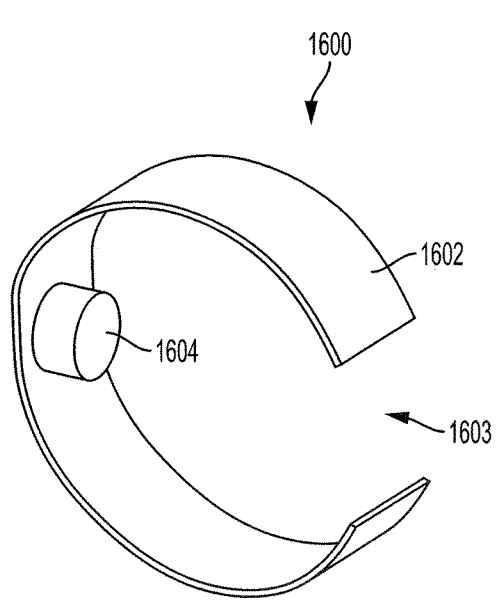

Referring to FIGS. 15 and 16B, an inverted spring clip 1600 may be used in place of the spring clip 1503. The inverted spring clip 1600 has a circular body 1602 that defines an opening 1603 and a protrusion 1604 extending towards a center of the inverted spring clip 1600. In order to use the inverted spring clip 1600, the narrow portion 1507 of the first tube 1502 may be inserted into the main portion 1509 of the second tube 1504. The circular body 1602 may be positioned around the main portion 1509 of the second tube 1504 such that the protrusion 1604 extends through one of the through-holes 1522, 1524 and a corresponding through-hole 1514, 1516.

Figure 16C:
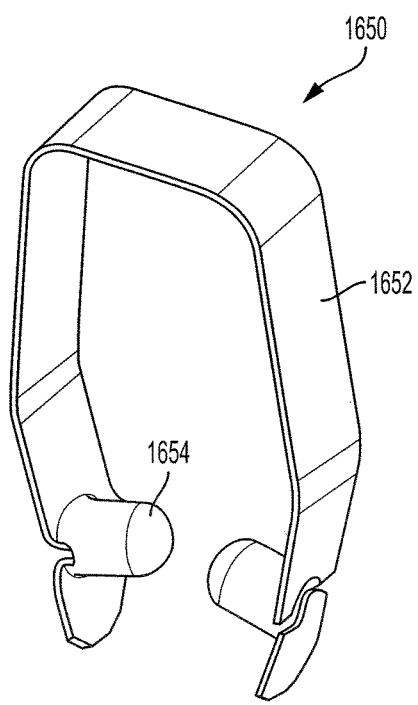

Referring to FIGS. 15 and 16C, another inverted spring clip 1650 may be used in place of the spring clip 1503. The inverted spring clip 1600 has a body 1652 which may have any shape and a protrusion 1654 extending towards a center of the inverted spring clip 1650. In order to use the inverted spring clip 1650, the narrow portion 1507 of the first tube 1502 may be inserted into the main portion 1509 of the second tube 1504. The body 1652 may be positioned around the main portion 1509 of the second tube 1504 such that the protrusion 1654 extends through one of the through-holes 1522, 1524 and a corresponding through-hole 1514, 1516.

Figure 17:
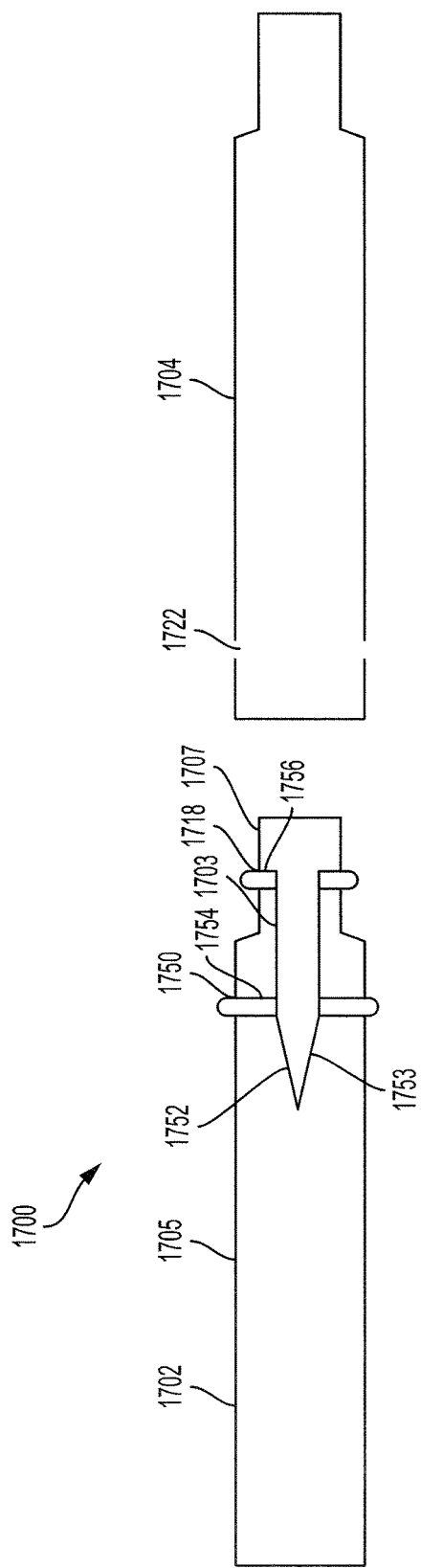
FIG. 17 illustrates a modular pole having two tubes coupled together using a spring clip with an auxiliary retractable protrusion and a first retractable protrusion according to an embodiment of the invention.

Referring to FIG. 17, a modular pole 1700 may include a first tube 1702, a second tube 1704, and a spring clip 1703.

The first tube 1702 may include a main portion 1705 and a narrow portion 1707. The main portion 1705 defines an auxiliary through-hole 1750 and the narrow portion 1707 defines a first through-hole 1718. The second tube 1704 defines a second through-hole 1722 that is designed to be aligned with the first through-hole 1718 when the narrow portion 1707 is received by the second tube 1704.

The spring clip 1703 includes a first leg 1752 and a second leg 1753. The first leg 1752 includes an auxiliary retractable protrusion 1754 and a first retractable protrusion 1756. When the narrow portion 1707 is received by the second tube 1704, the first retractable protrusion 1756 may extend through the first through-hole 1718 and the second through-hole 1722. The auxiliary retractable protrusion 1754 may extend through the auxiliary through-hole 1750 alone. The first retractable protrusion 1756 may effectively attach the first tube 1702 to the second tube 1704.

In order to decouple the first tube 1702 from the second tube 1704, the first retractable protrusion 1756 is to be removed from the second through-hole 1722. Because the first retractable protrusion 1756 is positioned on the first leg 1752 along with the auxiliary retractable protrusion 1754, retraction of the auxiliary retractable protrusion 1754 will cause the first retractable protrusion 1756 to retract through the second through-hole 1722. In that regard, decoupling of the first tube 1702 from the second tube 1704 may be easier using the spring clip 1703 having the auxiliary retractable protrusion 1754 than the spring clip 1503 of FIG. 15.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A modular pole for use with a pool device comprising:
    a first tube having a first end and a second end, the second end defining a first through-hole oriented perpendicular to an axis of the first tube;
    a second tube having a first end and a second end, the first end defining a second through-hole oriented perpendicular to an axis of the second tube, and the second end including a device connector for connecting the second tube to the pool device; and
    a first tube connector configured to be positioned within the first tube and the second tube and having a first retractable protrusion configured to extend through the first through-hole when the first tube connector is positioned within the first tube and a second retractable protrusion configured to extend through the second through-hole when the first tube connector is positioned within the second tube, and wherein the first tube has a first outer diameter and the second tube has a second outer diameter that is equal to the first outer diameter.

2. The modular pole of claim 1 wherein the first tube is a handle rod having a gripping material attached to an outer surface of the handle rod proximate to the first end and the second tube is a device rod configured to be connected to the pool device.

3. The modular pole of claim 1 further comprising:
    a third tube having a first end and a second end, the first end defining a third through-hole oriented perpendicular to an axis of the third tube, and the second end defining a fourth through-hole oriented perpendicular to the axis of the third tube; and
    a second tube connector configured to be positioned within the first tube and the third tube and having a third retractable protrusion configured to extend through the first through-hole when the second tube connector is positioned within the first tube and a fourth retractable protrusion configured to extend through the third through-hole when the second tube connector is positioned within the third tube,
    wherein the first tube connector is configured to be positioned within the third tube and the second tube such that the first retractable protrusion of the first tube connector extends through the fourth through-hole of the third tube and the second retractable protrusion of the first tube connector extends through the second through-hole of the second tube.

4. A modular pole for use with a pool device comprising:
    a first tube having a first end and a narrow end, the narrow end defining a first through-hole oriented perpendicular to an axis of the first tube;
    a second tube having a first end and a narrow end, the first end defining a second through-hole oriented perpendicular to an axis of the second tube, the first end of the second tube configured to receive the narrow end of the first tube, and at least one of the first end of the first tube or the narrow end of the second tube including a device connector for connecting the first tube or the second tube to the pool device, and wherein the first end of the first tube has a first diameter and the first end of the second tube has a second diameter that is equal to the first diameter; and
    a first spring clip having a first retractable protrusion configured to extend through the first through-hole of the first tube and the second through-hole of the second tube when the first spring clip is coupled to the first tube and the second tube, the first retractable protrusion coupling the first tube to the second tube.

5. The modular pole of claim 4 wherein:
    the first tube and the second tube each have a main portion and a narrow portion that includes the narrow end and has a smaller diameter than the main portion;
    the main portion of the first tube defines an auxiliary through-hole; and
    the first spring clip includes a first leg that includes the first retractable protrusion and an auxiliary retractable protrusion that is configured to extend through the auxiliary through-hole such that depression of the auxiliary retractable protrusion causes the first retractable protrusion to retract through the first through-hole and the second through-hole to de-couple the first tube from the second tube.

6. The modular pole of claim 4 wherein the first tube is a handle rod having a gripping material attached to an outer surface of the handle rod proximate to the first end and the second tube is a device rod configured to be connected to the pool device.

7. The modular pole of claim 4 further comprising:
    a third tube having a first end and a narrow end, the first end defining a third through-hole oriented perpendicular to an axis of the third tube, and the narrow end defining a fourth through-hole oriented perpendicular to the axis of the third tube; and
    a second spring clip having a second retractable protrusion configured to extend through the first through-hole of the first tube and the third through-hole of the third tube when the first spring clip is coupled to the first tube and the third tube, coupling the first tube to the third tube, wherein the first retractable protrusion of the first spring clip is configured to extend through the fourth through-hole of the third tube and the second through-hole of the second tube when the first spring clip is coupled to the first tube and the second tube, the first retractable protrusion coupling the third tube to the second tube.

8. A modular pole for use with a pool device comprising:

a first tube having a first end and a narrow end that defines a first through-hole;

a second tube having a first end and a second end, the first end defining a second through-hole and configured to receive the narrow end of the first tube, at least one of the first end of the first tube or the second end of the second tube including a device connector for connecting the first tube or the second tube to the pool device, and wherein the first end of the first tube has a first diameter and the first end of the second tube has a second diameter that is equal to the first diameter; and a first spring clip having a first protrusion configured to extend through the first through-hole of the first tube and the second through-hole of the second tube when the first spring clip is coupled to the first tube and the second tube, the first retractable protrusion coupling the first tube to the second tube.

9. The modular pole of claim 8 wherein:

the first tube includes a main portion and a narrow portion that includes the narrow end and has a smaller diameter than the main portion;

the main portion of the first tube defines an auxiliary through-hole; and the first spring clip includes a first leg that includes the first retractable protrusion and an auxiliary retractable protrusion that is configured to extend through the auxiliary through-hole such that depression of the auxiliary retractable protrusion causes the first retractable protrusion to retract through the first through-hole and the second through-hole to de-couple the first tube from the second tube.

10. The modular pole of claim 9 wherein:

the main portion of the first tube defines a third through-hole;

the second tube defines a fourth through-hole; and the first spring clip includes a second leg that includes a second protrusion that is configured to extend through the third through-hole of the first tube and the fourth through-hole of the second tube.

11. The modular pole of claim 8 wherein the first tube or the second tube is a handle rod having a gripping material attached to an outer surface of the handle rod proximate to the first end and the other of the first tube or the second tube is a device rod configured to be connected to the pool device.

12. The modular pole of claim 8 wherein the second end of the second tube is a narrow end and has a smaller diameter than the first end of the second tube.

13. The modular pole of claim 12 wherein the narrow end of the second tube defines a third hole configured to receive a protrusion from a second spring clip to couple the second tube to at least one of a third tube or the pool device.

* * * * *